(12) United States Patent
You

(10) Patent No.: US 12,362,864 B2
(45) Date of Patent: Jul. 15, 2025

(54) METHOD AND APPARATUS FOR DATA RETRANSMISSION BASED ON AUTOMATIC REPEAT REQUEST IN COMMUNICATION NETWORK

(71) Applicant: ELECTRONICS AND TELECOMMUNICATIONS RESEARCH INSTITUTE, Daejeon (KR)

(72) Inventor: Duk Hyun You, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 459 days.

(21) Appl. No.: 17/565,111

(22) Filed: Dec. 29, 2021

(65) Prior Publication Data

US 2022/0216950 A1 Jul. 7, 2022

(30) Foreign Application Priority Data

Dec. 31, 2020 (KR) ......................... 10-2020-0189908
Dec. 29, 2021 (KR) ......................... 10-2021-0190733

(51) Int. Cl.
*H04L 1/1812* (2023.01)
*H04L 1/00* (2006.01)
(Continued)

(52) U.S. Cl.
CPC .......... *H04L 1/1812* (2013.01); *H04L 1/0084* (2013.01); *H04W 28/065* (2013.01); *H04W 72/0446* (2013.01); *H04W 80/02* (2013.01)

(58) Field of Classification Search
CPC ... H04L 1/1812; H04L 1/0084; H04L 1/1822; H04W 72/0446; H04W 28/065; H04W 80/02
See application file for complete search history.

(56) References Cited

U.S. PATENT DOCUMENTS 10,615,923 B2   4/2020  You et al.
2009/0290598 A1* 11/2009  Pani ..................... H04L 1/1874
                                                 370/473
(Continued)

FOREIGN PATENT DOCUMENTS

WO        2019/195446 A1    10/2019

OTHER PUBLICATIONS

Author Unknown, RLC AM Re-segmentation mechanism and header structure, pp. 1-3, Doc. No. R2-073535, Aug. 24, 2007.*
(Continued)

*Primary Examiner* — Christopher M Crutchfield
(74) *Attorney, Agent, or Firm* — Rabin & Berdo, P.C.

(57) ABSTRACT

An operation method of a first communication node including a PHY layer, a MAC layer, and an RLC layer may comprise: delivering, by the MAC layer, first information requesting transmission of one or more RLC SDUs to the RLC layer; selecting, by the RLC layer, at least one RLC SDU based on the first information; performing, by the RLC layer, a segment operation on the at least one RLC SDU; delivering, by the RLC layer, an RLC PDU generated based on a result of the segment operation to the MAC layer; delivering, by the MAC layer, a MAC PDU generated based on the RLC PDU to the PHY layer; and transmitting, by the PHY layer, a PPDU generated based on the MAC PDU to a second communication node.

20 Claims, 11 Drawing Sheets

(51) Int. Cl.
*H04W 28/06* (2009.01)
*H04W 72/0446* (2023.01)
*H04W 80/02* (2009.01)

(56) References Cited

U.S. PATENT DOCUMENTS

| | | | |
|---|---|---|---|
| 2016/0192376 A1* | 6/2016 | Lee | H04W 48/20 |
| | | | 370/252 |
| 2017/0310421 A1* | 10/2017 | Fröberg Olsson | H04L 12/4625 |
| 2018/0206213 A1* | 7/2018 | Kim | H04L 69/22 |
| 2018/0219791 A1* | 8/2018 | Yu | H04L 69/22 |
| 2019/0053326 A1* | 2/2019 | Lee | H04W 76/36 |
| 2019/0208541 A1* | 7/2019 | Lee | H04W 72/0453 |
| 2020/0186293 A1 | 6/2020 | You | |
| 2020/0244405 A1 | 7/2020 | Li et al. | |
| 2020/0328851 A1 | 10/2020 | Ji et al. | |
| 2020/0382207 A1 | 12/2020 | Medles et al. | |
| 2022/0150693 A1* | 5/2022 | Kim | H04W 12/033 |

OTHER PUBLICATIONS

3GPP TR 38.811 V15.4.0 (Sep. 2020), 3rd Generation Partnership Project; Technical Specification Group Radio Access Network; Study on New Radio (NR) to support non-terrestrial networks (Release 15), pp. 1-127.

3GPP TR 38.821 V16.0.0 (Dec. 2019), 3rd Generation Partnership Project; Technical Specification Group Radio Access Network; Solutions for NR to support non-terrestrial networks (NTN) (Release 16), pp. 1-140.

3GPP TS 38.211 V16.3.0 (Sep. 2020), 3rd Generation Partnership Project; Technical Specification Group Radio Access Network; NR; Physical channels and modulation (Release 16), pp. 1-133.

3GPP TS 38.212 V16.3.0 (Sep. 2020), 3rd Generation Partnership Project; Technical Specification Group Radio Access Network; NR; Multiplexing and channel coding (Release 16), pp. 1-152.

3GPP TS 38.213 V16.3.0 (Sep. 2020), 3rd Generation Partnership Project; Technical Specification Group Radio Access Network; NR; Physical layer procedures for control (Release 16), pp. 1-179.

3GPP TS 38.214 V16.2.0 (Jun. 2020), 3rd Generation Partnership Project; Technical Specification Group Radio Access Network; NR; Physical layer procedures for data (Release 16), pp. 1-163.

3GPP TS 38.306 V16.2.0 (Sep. 2020), 3rd Generation Partnership Project; Technical Specification Group Radio Access Network; NR; User Equipment (UE) radio access capabilities (Release 16), pp. 1-126.

3GPP TS 38.321 V16.2.1 (Sep. 2020), 3rd Generation Partnership Project; Technical Specification Group Radio Access Network; NR; Medium Access Control (MAC) protocol specification (Release 16), pp. 1-154.

3GPP TS 38.322 V16.1.0 (Jul. 2020), 3rd Generation Partnership Project; Technical Specification Group Radio Access Network; NR; Radio Link Control (RLC) protocol specification (Release 16), pp. 1-33.

3GPP TS 38.331 V16.2.0 (Sep. 2020), 3rd Generation Partnership Project; Technical Specification Group Radio Access Network; NR; Radio Resource Control (RRC) protocol specification (Release 16), pp. 1-921.

\* cited by examiner

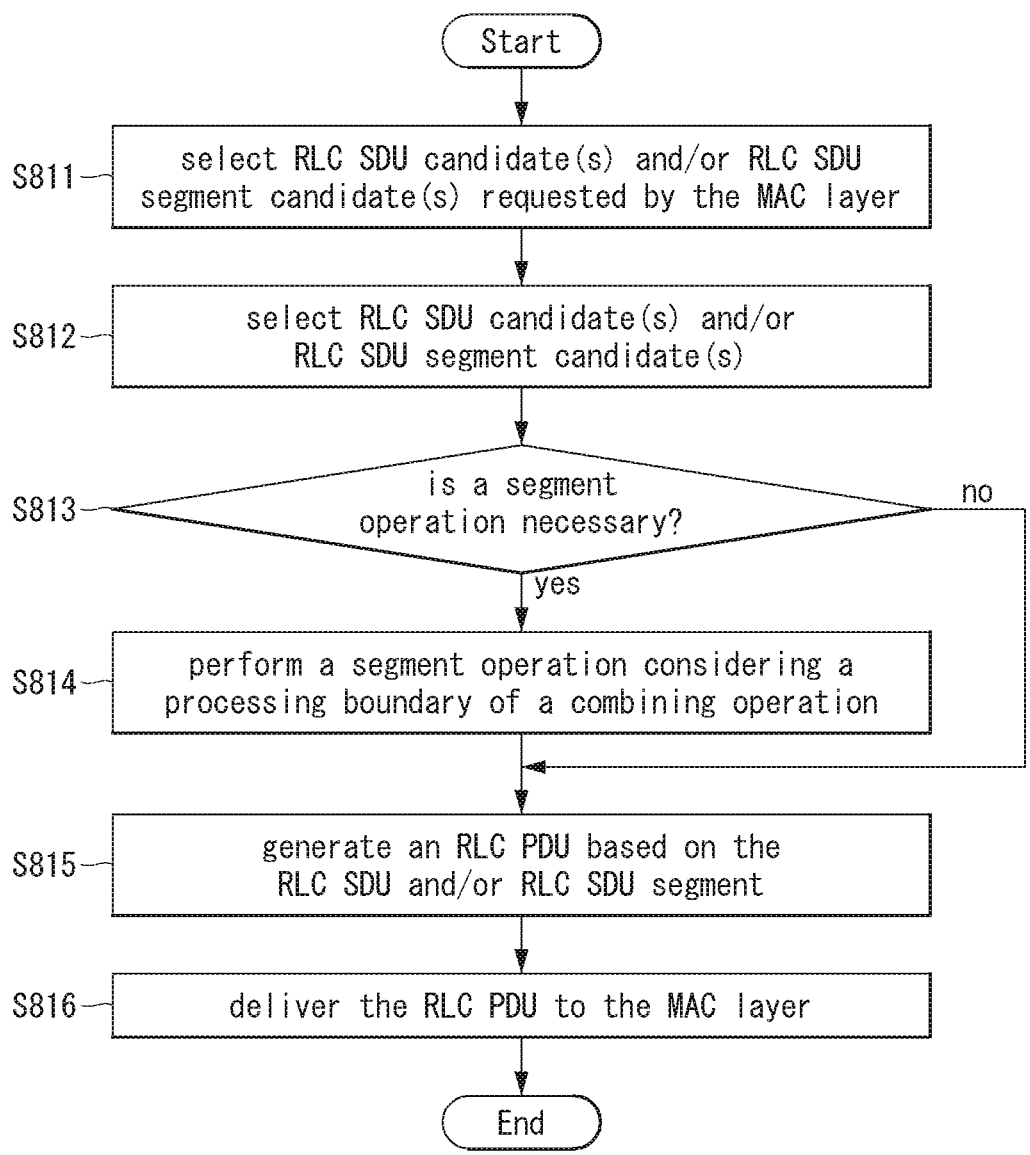

METHOD AND APPARATUS FOR DATA RETRANSMISSION BASED ON AUTOMATIC REPEAT REQUEST IN COMMUNICATION NETWORK

CROSS-REFERENCE TO RELATED APPLICATIONS

This application claims priority to Korean Patent Applications No. 10-2020-0189908 filed on Dec. 31, 2020, and No. 10-2021-0190733 filed on Dec. 29, 2021, with the Korean Intellectual Property Office (KIPO), the entire contents of which are hereby incorporated by reference.

BACKGROUND

1. Technical Field

The present disclosure relates to a retransmission technique in a communication network, and more particularly, to a data retransmission technique based on automatic repeat request (ARQ).

2. Related Art

With the development of information and communication technology, various wireless communication technologies have been developed. The communication system (hereinafter, a new radio (NR) communication system) using a higher frequency band (e.g., a frequency band of 6 GHz or above) than a frequency band (e.g., a frequency band of 6 GHz or below) of the long term evolution (LTE) (or, LTE-A) is being considered for processing of soaring wireless data. The NR communication system may support not only a frequency band below 6 GHz but also a 6 GHz or higher frequency band and may support various communication services and scenarios as compared to the LTE communication system. For example, usage scenarios of the NR communication system may include enhanced mobile broadband (eMBB), ultra-reliable low-latency communication (URLLC), massive machine type communication (mMTC), and the like. Communication technologies for satisfying the requirements of eMBB, URLLC, and mMTC are required.

The NR communication network may provide a communication service to terrestrial terminals. Recently, as well as the terrestrial terminals, the demand for communication services for non-terrestrial vehicles such as airplanes, drones, satellites, etc. is increasing, and for this purpose, a non-terrestrial network (NTN) technology is being discussed. The NTN may be implemented based on the NR technology. For example, in the NTN, communication between a satellite and a communication node located on the ground (e.g., user equipment (UE)) or a non-terrestrial communication node (e.g., airplane, drone) may be performed based on the NR technology. In the NTN, a satellite may perform functions of a base station in the NR communication network.

Meanwhile, in the communication network (e.g., LTE communication network, NR communication network, NTN), data may be retransmitted based on a hybrid automatic repeat request (HARQ) retransmission operation and/or an automatic repeat request (ARQ) retransmission operation. The HARQ retransmission operation may support a forward error correction (FEC) function, and the ARQ retransmission operation may not support the FEC function. That is, the HARQ retransmission operation and the ARQ retransmission operation may be distinguished according to whether the FEC function is performed. When the FEC operation is performed, data retransmission performance may be improved.

Therefore, with respect to the same signal to noise ratio (SNR) or signal to interference plus noise ratio (SINR), a block error ratio (BLER) when the HARQ retransmission operation is performed may be less than a BLER when the ARQ retransmission operation is performed. The communication reliability when the HARQ retransmission operation is performed may be higher than the communication reliability when the ARQ retransmission operation is performed. In exemplary embodiments, 'S(I)NR' may refer to SNR or SINR.

The HARQ retransmission operation may be preferentially performed in a physical (PHY) layer and a medium access control (MAC) layer, and then the ARQ retransmission operation may be performed in a radio link control (RLC) layer. That is, the ARQ retransmission operation may supplement the HARQ retransmission operation. In an NTN and/or an NR communication network supporting sidelink communication, a HARQ feedback operation may be disabled. In this case, since the HARQ retransmission operation is not performed, communication reliability may need to be ensured using only the ARQ retransmission operation.

From the perspective of the PHY layer, ARQ retransmission may be processed as initial transmission. In this case, an FEC operation through combining initial transmission data and ARQ retransmission data may not be performed. Therefore, only opportunistic retransmission performance according to a channel state may be expected. Although a coherent time exists according to a channel state, the coherent time may be valid for a short time (e.g., an interval between reference signals). When the ARQ retransmission operation is performed, there may not be a channel state correlation between (re)transmission time points. In this reason, whether or not the ARQ retransmission is successful may vary depending on the channel state. If the channel state is good at a time of the ARQ retransmission, the corresponding ARQ retransmission may be successful. If the channel state is bad at the time of the ARQ retransmission, the corresponding ARQ retransmission may fail. In this case, it may be difficult to guarantee the communication reliability.

SUMMARY

Accordingly, exemplary embodiments of the present disclosure are directed to providing methods and apparatuses for retransmission based on automatic repeat request (ARQ).

According to a first exemplary embodiment of the present disclosure, an operation method of a first communication node including a physical (PHY) layer, a medium access control (MAC) layer, and a radio link control (RLC) layer may comprise: delivering, by the MAC layer, first information requesting transmission of one or more RLC service data units (SDUs) to the RLC layer; selecting, by the RLC layer, at least one RLC SDU based on the first information; performing, by the RLC layer, a segment operation on the at least one RLC SDU; delivering, by the RLC layer, an RLC protocol data unit (PDU) generated based on a result of the segment operation to the MAC layer; delivering, by the MAC layer, a MAC PDU generated based on the RLC PDU to the PHY layer; and transmitting, by the PHY layer, a physical PDU (PPDU) generated based on the MAC PDU to a second communication node.

The first information may include at least one of a sequence number (SN), segment offset (SO), hybrid automatic repeat request (HARQ) process number, or time resource information of each of the one or more RLC SDUs or RLC SDU segments.

The operation method may further comprise delivering, by the MAC layer, second information indicating a second size of transmission data to the RLC layer, wherein when the second size is larger than a first size of the one or more RLC SDUs indicated by the first information, one RLC SDU or one RLC SDU segment having a size corresponding to (second size-first size) may be additionally selected.

The operation method may further comprise delivering, by the MAC layer, second information indicating a second size of transmission data to the RLC layer, wherein when the second size is less than a first size of the one or more RLC SDUs indicated by the first information, an RLC SDU segment having a size corresponding to (first size-second size) may be generated by performing a segment operation for one RLC SDU among the one or more RLC SDUs, and the RLC SDU segment may not be included in the RLC PDU generated by the RLC layer.

The segment operation may be performed in consideration of a processing unit of a data unit in a rate matching operation or a combining operation of the second communication node, and the processing unit may be determined based on at least one of a transport block size (TBS), code block group size (CBGS), code block size (CBS), overhead, or a combination thereof.

A reference size of the segment operation may be determined based on the processing unit of the rate matching operation or the combining operation, and the reference size may be determined based on a linear combination of the processing unit.

The reference size of the segment operation may be determined in the MAC layer or determined in the RLC layer based on parameter(s) provided by the MAC layer.

The delivering of the MAC PDU to the PHY layer may comprise: generating, by the MAC layer, a plurality of MAC subPDUs based on the RLC PDU; generating, by the MAC layer, the MAC PDU by performing a multiplexing operation for the plurality of MAC subPDUs so that positions of previous data units within a transport block (TB) and positions of the plurality of MAC subPDUs within a TB are same; and delivering, by the MAC layer, the MAC PDU to the PHY layer.

The RLC PDU or the plurality of MAC subPDUs may include at least one of the previous data units, a subset of the previous data units, initial transmission data, automatic repeat request (ARQ) retransmission data, or a combination thereof.

The multiplexing operation may be performed based on preconfigured multiplexing information, and the preconfigured multiplexing information includes information indicating the positions in which the plurality of MAC subPDUs are multiplexed within the TB, information on a HARQ process number to which the plurality of MAC subPDUs are mapped, time resource information, information for identifying the at least one RLC SDU, information for identifying an RLC SDU segment, or a combination thereof.

The multiplexing operation may be performed so that a size of the MAC PDU delivered to the PHY layer is determined based on a linear combination of a processing unit of a data unit in a rate matching operation of the first communication node or a combining operation of the second communication node.

The preconfigured multiplexing information may be updated based on a result of the multiplexing operation for the plurality of MAC subPDUs.

The operation method may further comprise: transmitting, to the second communication node, scheduling information of the PPDU and third information indicating whether to perform a partial combining operation for the PPDU, wherein the PPDU includes at least one of a subset of previous data units or ARQ retransmission data, and the third information is determined based on at least of a new data indicator (NDI), code block group transmission information (CBGTI), code block transmission information (CBTI), or a combination thereof.

According to a second exemplary embodiment of the present disclosure, an operation method of a first communication node including a physical (PHY) layer, a medium access control (MAC) layer, and a radio link control (RLC) layer may comprise: delivering, by the RLC layer, an RLC protocol data unit (PDU) to the MAC layer; generating, by the MAC layer, a plurality of MAC subPDUs based on the RLC PDU; generating, by the MAC layer, a MAC PDU by performing a multiplexing operation for the plurality of MAC subPDUs so that positions of previous data units in a transport block (TB) and positions of the plurality of MAC subPDUs in a TB are same; delivering, by the MAC layer, the MAC PDU to the PHY layer; and transmitting, by the PHY layer, a physical PDU (PPDU) generated based on the MAC PDU to a second communication node.

The MAC PDU or the plurality of MAC subPDUs may include at least one of the previous data units, a subset of the previous data units, initial transmission data, automatic repeat request (ARQ) retransmission data, or a combination thereof.

The multiplexing operation may be performed based on preconfigured multiplexing information, and the preconfigured multiplexing information may include at least one of information indicating the positions in which the plurality of MAC subPDUs are multiplexed within the TB, information on a HARQ process number to which the plurality of MAC subPDUs are mapped, time resource information, information for identifying the at least one RLC SDU, information for identifying an RLC SDU segment, or a combination thereof.

The preconfigured multiplexing information may be updated based on a result of the multiplexing operation for the plurality of MAC subPDUs.

The multiplexing operation may be performed so that a size of the MAC PDU delivered to the PHY layer is determined based on a linear combination of a processing unit of a data unit in a rate matching operation of the first communication node or a combining operation of the second communication node.

The delivering of the RLC PDU to the MAC layer may comprise: delivering, by the MAC layer, first information requesting transmission of one or more RLC SDUs to the RLC layer; selecting, by the RLC layer, at least one RLC SDU based on the first information; performing, by the RLC layer, a segment operation on the at least one RLC SDU; and delivering, by the RLC layer, the RLC PDU generated based on a result of the segment operation to the MAC layer.

The segment operation may be performed in consideration of a processing unit of a data unit in a rate matching operation of the first communication node or a combining operation of the second communication node, the processing unit may be determined based on at least one of a transport block size (TBS), code block group size (CBGS), code block size (CBS), overhead, or a combination thereof, a reference size of the segment operation may be determined based on the processing unit, and the reference size may be determined based on a linear combination of the processing unit.

According to the present disclosure, when an ARQ retransmission operation is performed, a transmitter may selectively include a combination of ARQ retransmission data and ARQ initial transmission data in one transmission, and a receiver may perform a combining operation on an intersection (or a subset of the intersection) of the ARQ retransmission data (e.g., current data (e.g., the n-th ARQ retransmission data)) and previous data (e.g., the m-th (m<n) transmission data). Accordingly, the communication reliability can be improved, the transmission latency can be reduced because the number of data retransmissions is reduced, and channel adaptation performance can also be improved. Since retransmission of a portion of data units becomes possible in the ARQ retransmission procedure, resources required for retransmission may not be wasted. That is, the efficiency of resource use can be improved.

BRIEF DESCRIPTION OF DRAWINGS

FIG. 8A is a flowchart illustrating a second exemplary embodiment of an ARQ retransmission operation performed in an RLC layer.

DETAILED DESCRIPTION OF THE EMBODIMENTS

Figure 1:
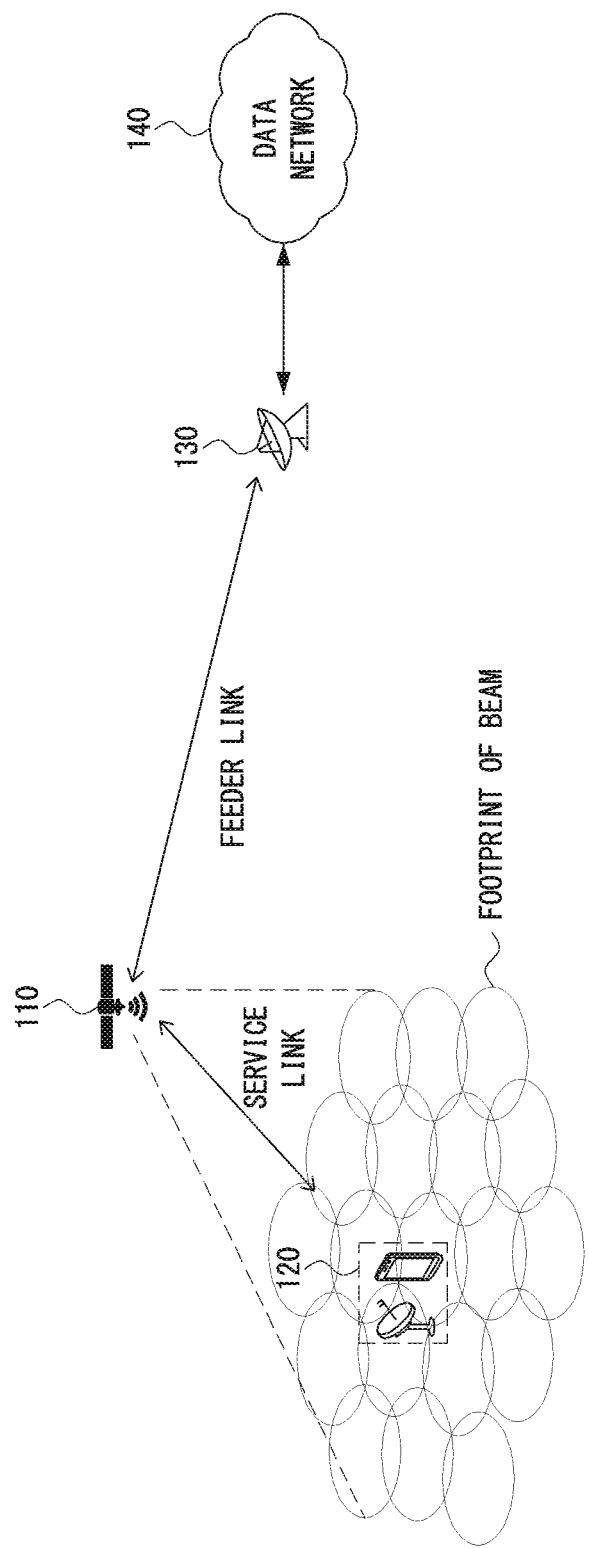
FIG. 1 is a conceptual diagram illustrating a first exemplary embodiment of a non-terrestrial network.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may mean "at least one of A or B" or "at least one of combinations of one or more of A and B". Also, in exemplary embodiments of the present disclosure, "one or more of A and B" may mean "one or more of A or B" or "one or more of combinations of one or more of A and B".

In exemplary embodiments of the present disclosure, "(re)transmission" may mean "transmission", "retransmission", or "transmission and retransmission", "(re)configuration" may mean "configuration", "reconfiguration", or "configuration and reconfiguration", "(re)connection" may mean "connection", "reconnection", or "connection and reconnection", and "(re)access" may mean "access", "re-access", or "access and re-access".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication network to which exemplary embodiments according to the present disclosure are applied will be described. The communication system may be a non-terrestrial network (NTN), a 4G communication network (e.g., long-term evolution (LTE) communication network), a 5G communication network (e.g., new radio (NR) communication network), or the like. The 4G communication network and the 5G communication network may be classified as terrestrial networks.

The NTN may operate based on the LTE technology and/or the NR technology. The NTN may support communications in frequency bands below 6 GHz as well as in frequency bands above 6 GHz. The 4G communication network may support communications in the frequency band below 6 GHz. The 5G communication network may support communications in the frequency band below 6 GHz as well as in the frequency band above 6 GHz. The communication network to which the exemplary embodiments according to the present disclosure are applied is not limited to the contents described below, and the exemplary embodiments according to the present disclosure may be applied to various communication networks. Here, the communication network may be used in the same sense as the communication system.

FIG. 1 is a conceptual diagram illustrating a first exemplary embodiment of a non-terrestrial network.

Referring to FIG. 1, a non-terrestrial network (NTN) may include a satellite 110, a communication node 120, a gateway 130, a data network 140, and the like. The NTN shown in FIG. 1 may be an NTN based on a transparent payload. The satellite 110 may be a low earth orbit (LEO) satellite, a medium earth orbit (MEO) satellite, a geostationary earth orbit (GEO) satellite, a high elliptical orbit (HEO) satellite, or an unmanned aircraft system (UAS) platform. The UAS platform may include a high altitude platform station (HAPS).

The communication node 120 may include a communication node (e.g., a user equipment (UE) or a terminal) located on a terrestrial site and a communication node (e.g., an airplane, a drone) located on a non-terrestrial place. A service link may be established between the satellite 110 and the communication node 120, and the service link may be a radio link. The satellite 110 may provide communication services to the communication node 120 using one or more beams. The shape of a footprint of the beam of the satellite 110 may be elliptical.

The communication node 120 may perform communications (e.g., downlink communication and uplink communication) with the satellite 110 using LTE technology and/or NR technology. The communications between the satellite 110 and the communication node 120 may be performed using an NR-Uu interface. When dual connectivity (DC) is supported, the communication node 120 may be connected to other base stations (e.g., base stations supporting LTE and/or NR functionality) as well as the satellite 110, and perform DC operations based on the techniques defined in the LTE and/or NR specifications.

The gateway 130 may be located on a terrestrial site, and a feeder link may be established between the satellite 110 and the gateway 130. The feeder link may be a radio link. The gateway 130 may be referred to as a 'non-terrestrial network (NTN) gateway'. The communications between the satellite 110 and the gateway 130 may be performed based on an NR-Uu interface or a satellite radio interface (SRI). The gateway 130 may be connected to the data network 140. There may be a 'core network' between the gateway 130 and the data network 140. In this case, the gateway 130 may be connected to the core network, and the core network may be connected to the data network 140. The core network may support the NR technology. For example, the core network may include an access and mobility management function (AMF), a user plane function (UPF), a session management function (SMF), and the like. The communications between the gateway 130 and the core network may be performed based on an NG-C/U interface.

Alternatively, a base station and the core network may exist between the gateway 130 and the data network 140. In this case, the gateway 130 may be connected with the base station, the base station may be connected with the core network, and the core network may be connected with the data network 140. The base station and core network may support the NR technology. The communications between the gateway 130 and the base station may be performed based on an NR-Uu interface, and the communications between the base station and the core network (e.g., AMF, UPF, SMF, and the like) may be performed based on an NG-C/U interface.

Figure 2:
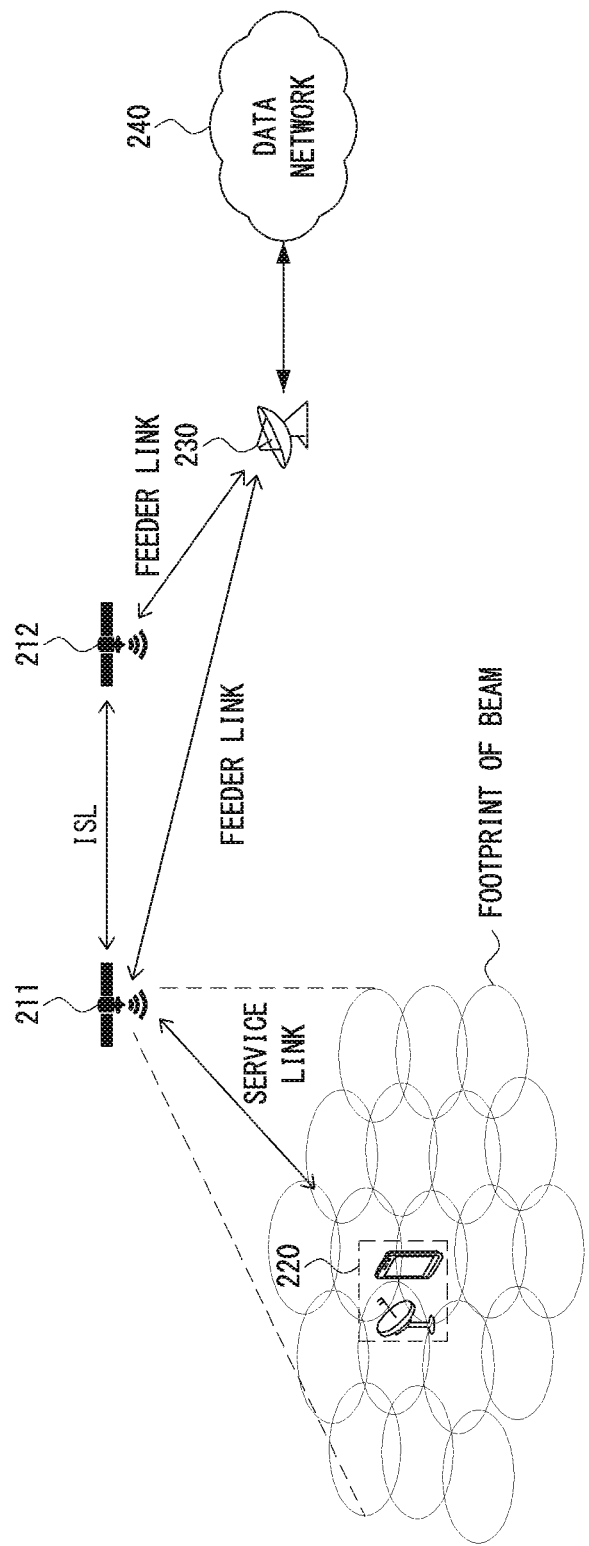
FIG. 2 is a conceptual diagram illustrating a second exemplary embodiment of a non-terrestrial network.

FIG. 2 is a conceptual diagram illustrating a second exemplary embodiment of a non-terrestrial network.

Referring to FIG. 2, a non-terrestrial network may include a first satellite 211, a second satellite 212, a communication node 220, a gateway 230, a data network 240, and the like. The NTN shown in FIG. 2 may be a regenerative payload based NTN. For example, each of the satellites 211 and 212 may perform a regenerative operation (e.g., demodulation, decoding, re-encoding, re-modulation, and/or filtering operation) on a payload received from other entities (e.g., the communication node 220 or the gateway 230), and transmit the regenerated payload.

Each of the satellites 211 and 212 may be a LEO satellite, a MEO satellite, a GEO satellite, a HEO satellite, or a UAS platform. The UAS platform may include a HAPS. The satellite 211 may be connected to the satellite 212, and an inter-satellite link (ISL) may be established between the satellite 211 and the satellite 212. The ISL may operate in an RF frequency band or an optical band. The ISL may be established optionally. The communication node 220 may include a terrestrial communication node (e.g., UE or terminal) and a non-terrestrial communication node (e.g., airplane or drone). A service link (e.g., radio link) may be established between the satellite 211 and communication node 220. The satellite 211 may provide communication services to the communication node 220 using one or more beams.

The communication node 220 may perform communications (e.g., downlink communication or uplink communication) with the satellite 211 using LTE technology and/or NR technology. The communications between the satellite 211 and the communication node 220 may be performed using an NR-Uu interface. When DC is supported, the communication node 220 may be connected to other base stations (e.g., base stations supporting LTE and/or NR functionality) as well as the satellite 211, and may perform DC operations based on the techniques defined in the LTE and/or NR specifications.

The gateway 230 may be located on a terrestrial site, a feeder link may be established between the satellite 211 and the gateway 230, and a feeder link may be established between the satellite 212 and the gateway 230. The feeder link may be a radio link. When the ISL is not established between the satellite 211 and the satellite 212, the feeder link between the satellite 211 and the gateway 230 may be established mandatorily.

The communications between each of the satellites 211 and 212 and the gateway 230 may be performed based on an NR-Uu interface or an SRI. The gateway 230 may be connected to the data network 240. There may be a core network between the gateway 230 and the data network 240. In this case, the gateway 230 may be connected to the core network, and the core network may be connected to the data network 240. The core network may support the NR technology. For example, the core network may include AMF, UPF, SMF, and the like. The communications between the gateway 230 and the core network may be performed based on an NG-C/U interface.

Alternatively, a base station and the core network may exist between the gateway 230 and the data network 240. In this case, the gateway 230 may be connected with the base station, the base station may be connected with the core network, and the core network may be connected with the data network 240. The base station and the core network may support the NR technology. The communications between the gateway 230 and the base station may be performed based on an NR-Uu interface, and the communications between the base station and the core network (e.g., AMF, UPF, SMF, and the like) may be performed based on an NG-C/U interface.

Meanwhile, entities (e.g., satellites, communication nodes, gateways, etc.) constituting the NTNs shown in FIGS. 1 and 2 may be configured as follows.

Figure 3:
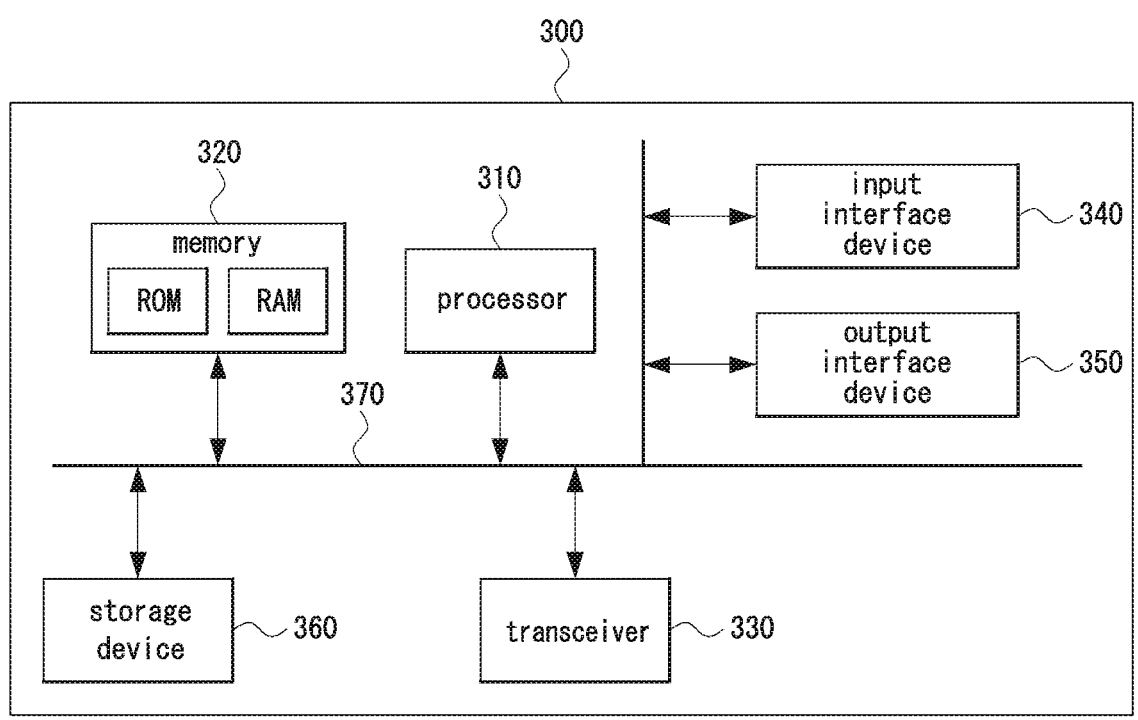
FIG. 3 is a block diagram illustrating a first exemplary embodiment of an entity constituting a non-terrestrial network.

FIG. 3 is a block diagram illustrating a first exemplary embodiment of an entity constituting a non-terrestrial network.

Referring to FIG. 3, an entity 300 may include at least one processor 310, a memory 320, and a transceiver 330 connected to a network to perform communication. In addition, the entity 300 may further include an input interface device 340, an output interface device 350, a storage device 360, and the like. The components included in the entity 300 may be connected by a bus 370 to communicate with each other. However, each component included in the entity 300 may be connected to the processor 310 through a separate interface or a separate bus instead of the common bus 370. For example, the processor 310 may be connected to at least one of the memory 320, the transceiver 330, the input interface device 340, the output interface device 350, and the storage device 360 through a dedicated interface.

The processor 310 may execute at least one instruction stored in at least one of the memory 320 and the storage device 360. The processor 310 may refer to a central processing unit (CPU), a graphics processing unit (GPU), or a dedicated processor on which the methods according to the exemplary embodiments of the present invention are performed. Each of the memory 320 and the storage device 360 may be configured as at least one of a volatile storage medium and a nonvolatile storage medium. For example, the memory 320 may be configured with at least one of a read only memory (ROM) and a random access memory (RAM).

Meanwhile, scenarios in the NTN may be defined as shown in Table 1 below.

TABLE 1

|  | NTN shown in FIG. 1 | NTN shown in FIG. 2 |
| --- | --- | --- |
| GEO | Scenario A | Scenario B |
| LEO (steerable beams) | Scenario C1 | Scenario D1 |
| LEO (beams moving with satellite) | Scenario C2 | Scenario D2 |

When the satellite 110 in the NTN shown in FIG. 1 is a GEO satellite (e.g., a GEO satellite that supports a transparent function), this may be referred to as 'scenario A'. When the satellites 211 and 212 in the NTN shown in FIG. 2 are GEO satellites (e.g., GEOs that support a regenerative function), this may be referred to as 'scenario B'.

When the satellite 110 in the NTN shown in FIG. 1 is an LEO satellite with steerable beams, this may be referred to as 'scenario C1'. When the satellite 110 in the NTN shown in FIG. 1 is an LEO satellite having beams moving with the satellite, this may be referred to as 'scenario C2'. When the satellites 211 and 212 in the NTN shown in FIG. 2 are LEO satellites with steerable beams, this may be referred to as 'scenario D1'. When the satellites 211 and 212 in the NTN shown in FIG. 2 are LEO satellites having beams moving with the satellites, this may be referred to as 'scenario D2'.

Parameters for the scenarios defined in Table 1 may be defined as shown in Table 2 below.

TABLE 2

|  | Scenarios A and B | Scenarios C and D |
| --- | --- | --- |
| Altitude | 35,786 km | 600 km<br>1,200 km |
| Spectrum (service link) | <6 GHz (e.g., 2 GHz)<br>>6 GHz (e.g., DL 20 GHz, UL 30 GHz) | |
| Maximum channel bandwidth capability (service link) | 30 MHz for band < 6 GHz<br>1 GHz for band > 6 GHz | |
| Maximum distance between satellite and communication node (e.g., UE) at the minimum elevation angle | 40,581 km | 1,932 km (altitude of 600 km)<br>3,131 km (altitude of 1,200 km) |
| Maximum round trip delay (RTD) (only propagation delay) | Scenario A: 541.46 ms (service and feeder links)<br>Scenario B: 270.73 ms (only service link) | Scenario C: (transparent payload: service and feeder links)<br>−5.77 ms (altitude of 600 km)<br>−41.77 ms (altitude of 1,200 km)<br>Scenario D: (regenerative payload: only service link)<br>−12.89 ms (altitude of 600 km)<br>−20.89 ms (altitude of 1,200 km) |
| Maximum delay variation within a single beam | 16 ms | 4.44 ms (altitude of 600 km)<br>6.44 ms (altitude of 1,200 km) |
| Maximum differential delay within a cell | 10.3 ms | 3.12 ms (altitude of 600 km)<br>3.18 ms (altitude of 1,200 km) |
| Service link | NR defined in 3GPP | |
| Feeder link | Radio interfaces defined in 3GPP or non-3GPP | |

In addition, in the scenarios defined in Table 1, delay constraints may be defined as shown in Table 3 below.

TABLE 3

|  | Scenario A | Scenario B | Scenario C1-2 | Scenario D1-2 |
|---|---|---|---|---|
| Satellite altitude | 35,786 km | | 600 km | |
| Maximum RTD in a radio interface between base station and UE | 541.75 ms (worst case) | 270.57 ms | 28.41 ms | 12.88 ms |
| Minimum RTD in a radio interface between base station and UE | 477.14 ms | 238.57 ms | 8 ms | 4 ms |

Hereinafter, ARQ retransmission methods will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station. In exemplary embodiments, an operation performed in each layer (e.g., PHY layer, MAC layer, or RLC layer) may be an operation performed by a processor included in the corresponding communication node (e.g., base station or terminal).

The ARQ retransmission operation may be performed in the RLC layer and/or the MAC layer. The size of ARQ retransmission data may be configured in units of RLC service data units (SDUs) or RLC SDU segments. In exemplary embodiments, an RLC SDU segment may be a result of a segment operation for an RLC SDU. The RLC SDU may be an SDU including RLC SDU segments. That is, the RLC SDU may include the RLC SDU segments. The size of each of the RLC SDU and the RLC SDU segment may be different from the size of a transport block (TB) or code block group (CBG). That is, a processing unit of ARQ retransmission may be different from that of a HARQ operation. An RLC feedback may indicate whether to perform retransmission for each RLC SDU or RLC SDU segment. A data unit requiring retransmission may be selected based on the RLC feedback, and the selected data unit may be retransmitted.

An interval at which the ARQ retransmission operation can be performed may be an RLC round trip time (RTT). The RLC RTT may be an interval from a transmission time of a data unit to a time when an RLC feedback for the data unit is available at a transmitter. The transmitter may refer to a base station or terminal. In the NR communication network, the RLC RTT may be configured for each subcarrier spacing (SCS). For example, the RLC RTT may be configured as shown in Table 4 below. When a GEO satellite provides a communication service in the NTN, a propagation delay may be long. In this case, the RLC RTT for the GEO satellite may be larger than the RLC RTT defined in Table 4.

TABLE 4

| SCS (KHz) | RLC RTT (ms) |
|---|---|
| 15 KHz | 50 |
| 30 KHz | 40 |
| 60 KHz | 30 |
| 120 KHz | 20 |

Figure 4:
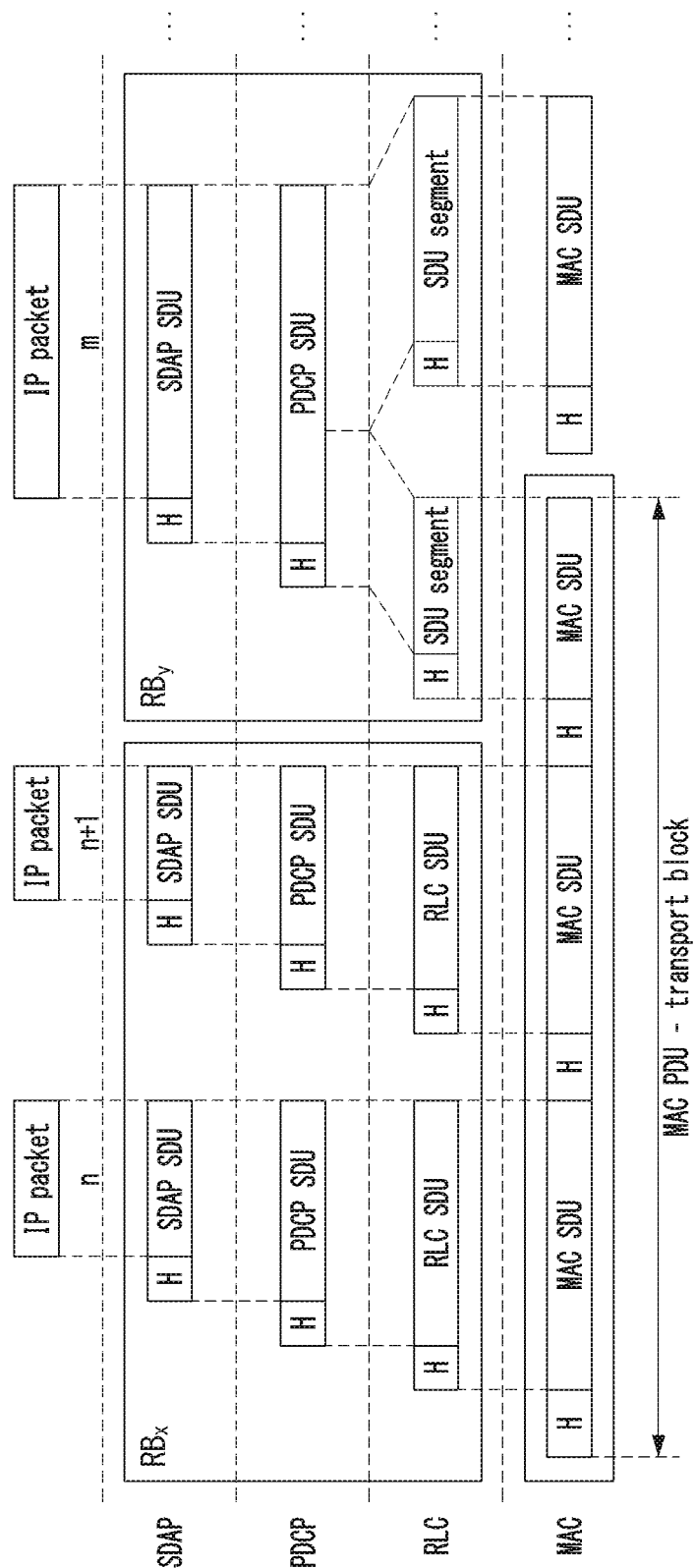
FIG. 4 is a conceptual diagram illustrating a first exemplary embodiment of a data flow.

FIG. 4 is a conceptual diagram illustrating a first exemplary embodiment of a data flow.

Referring to FIG. 4, an ARQ retransmission operation may be performed in the RLC layer and the MAC layer, which are layer-2 (L2) sublayers. The RLC layer may determine retransmission data (e.g., ARQ retransmission data) in units of an RLC SDU segment by performing a segment operation or a re-segment operation on an RLC SDU according to a data size required by the MAC layer. The RLC layer may generate an RLC protocol data unit (PDU) based on the RLC SDU and/or the RLC SDU segment and may deliver the RLC PDU to the MAC layer. The RLC PDU may include one or more RLC SDUs and/or one or more RLC SDU segments. The MAC layer may receive the RLC PDU (e.g., MAC SDU) from the RLC layer and may generate a MAC PDU (e.g., TB) based on the MAC SDU. At least one MAC control element (CE) may be multiplexed in the MAC PDU. In FIG. 4, H may mean a header in each sublayer.

Figure 5A:
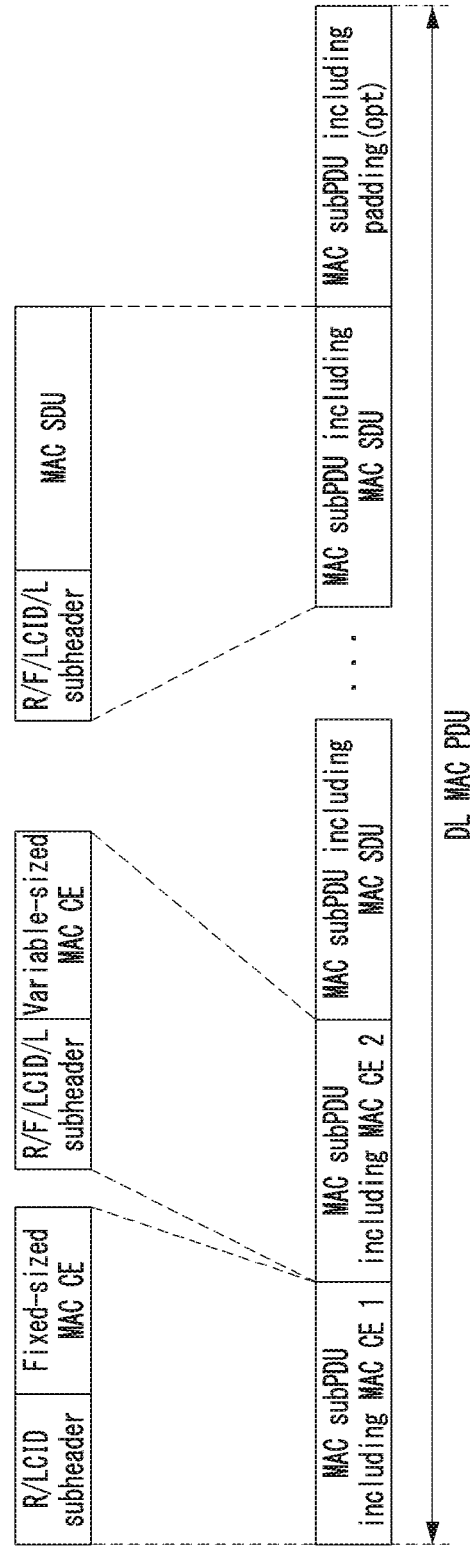
FIG. 5A is a conceptual diagram illustrating a first exemplary embodiment of a downlink (DL) MAC PDU.

FIG. 5A is a conceptual diagram illustrating a first exemplary embodiment of a downlink (DL) MAC PDU.

Referring to FIG. 5A, a DL MAC PDU may include one or more MAC subPDUs. The MAC subPDU may include a subheader, MAC CE, MAC SDU, and/or padding.

Figure 5B:
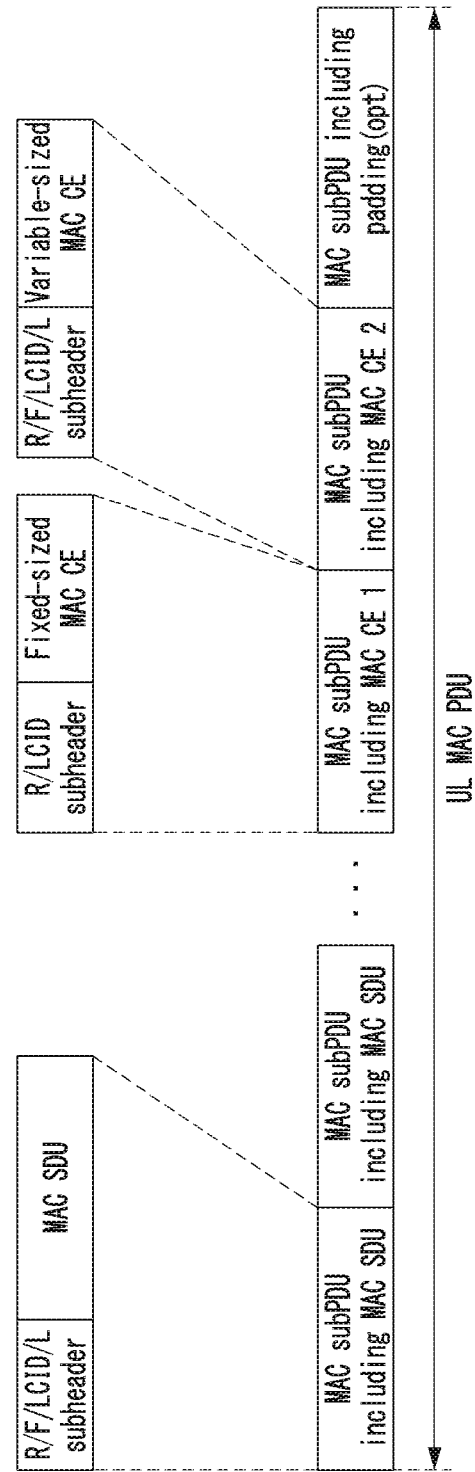
FIG. 5B is a conceptual diagram illustrating a first exemplary embodiment of an uplink (UL) MAC PDU.

FIG. 5B is a conceptual diagram illustrating a first exemplary embodiment of an uplink (UL) MAC PDU.

Referring to FIG. 5B, a UL MAC PDU may include one or more MAC subPDUs. The MAC subPDU may include a subheader, MAC CE, MAC SDU, and/or padding.

On the other hand, the HARQ retransmission operation may be performed in the PHY layer and/or the MAC layer. The size of HARQ retransmission data may be configured in units of a TB or CBG. An interval at which the HARQ retransmission operation can be performed may be a HARQ RTT. The HARQ RTT may be an interval from a transmission time of a data unit to a time when a HARQ feedback for the data unit is available at a transmitter. The HARQ feedback may indicate whether to perform retransmission for each TB or CBG. A data unit requiring retransmission may be selected based on the HARQ feedback, and the selected data unit may be retransmitted.

The maximum HARQ RTT may be determined according to the maximum number of HARQ processes. The maximum number of HARQ processes in the NR communication network may be 16. The length of a slot may be different for each SCS. Considering the maximum number of HARQ processes and the SCS, the maximum HARQ RTT may be defined as shown in Table 5 below.

TABLE 5

| SCS (KHz) | maximum HARQ RTT (ms) |
|---|---|
| 15 KHz | 16 |
| 30 KHz | 8 |
| 60 KHz | 4 |
| 120 KHz | 2 |

The maximum number of HARQ processes in the NTN may be 32 or more. In this case, the maximum HARQ RTT in the NTN may be greater than the maximum HARQ RTT defined in Table 5. For example, the maximum HARQ RTT in the NTN may be twice the maximum HARQ RTT defined in Table 5. The HARQ retransmission operation may be performed in the MAC layer, which is the L2 sublayer, and a layer-1 (L1) (e.g., PHY layer). The MAC layer may select retransmission data (e.g., HARQ retransmission data) and may deliver the retransmission data to the PHY layer. In addition, the MAC layer may determine parameter(s) to be used for HARQ retransmission and may provide the parameter(s) to the PHY layer. The above-described parameter(s) may include at least one of HARQ process number, redundancy version (RV), new data indicator (NDI), CBG transmission information (CBGTI), CBG flush out information (CBGFI), or a combination thereof.

The PHY layer may receive the retransmission data and the parameter(s) from the MAC layer and may perform a HARQ retransmission operation for the retransmission data based on the parameter(s). In order to maximize FEC effects, the parameter(s) for HARQ processing may be changed for each HARQ retransmission. The HARQ retransmission performance may be improved by FEC operations. In particular, a rate matching/de-matching operation may greatly contribute to the improvement of the HARQ retransmission performance. In exemplary embodiments, the rate matching/de-matching operation may refer to 'rate matching operation', 'rate de-matching operation', or 'rate matching operation and rate de-matching operation'.

Figure 6:
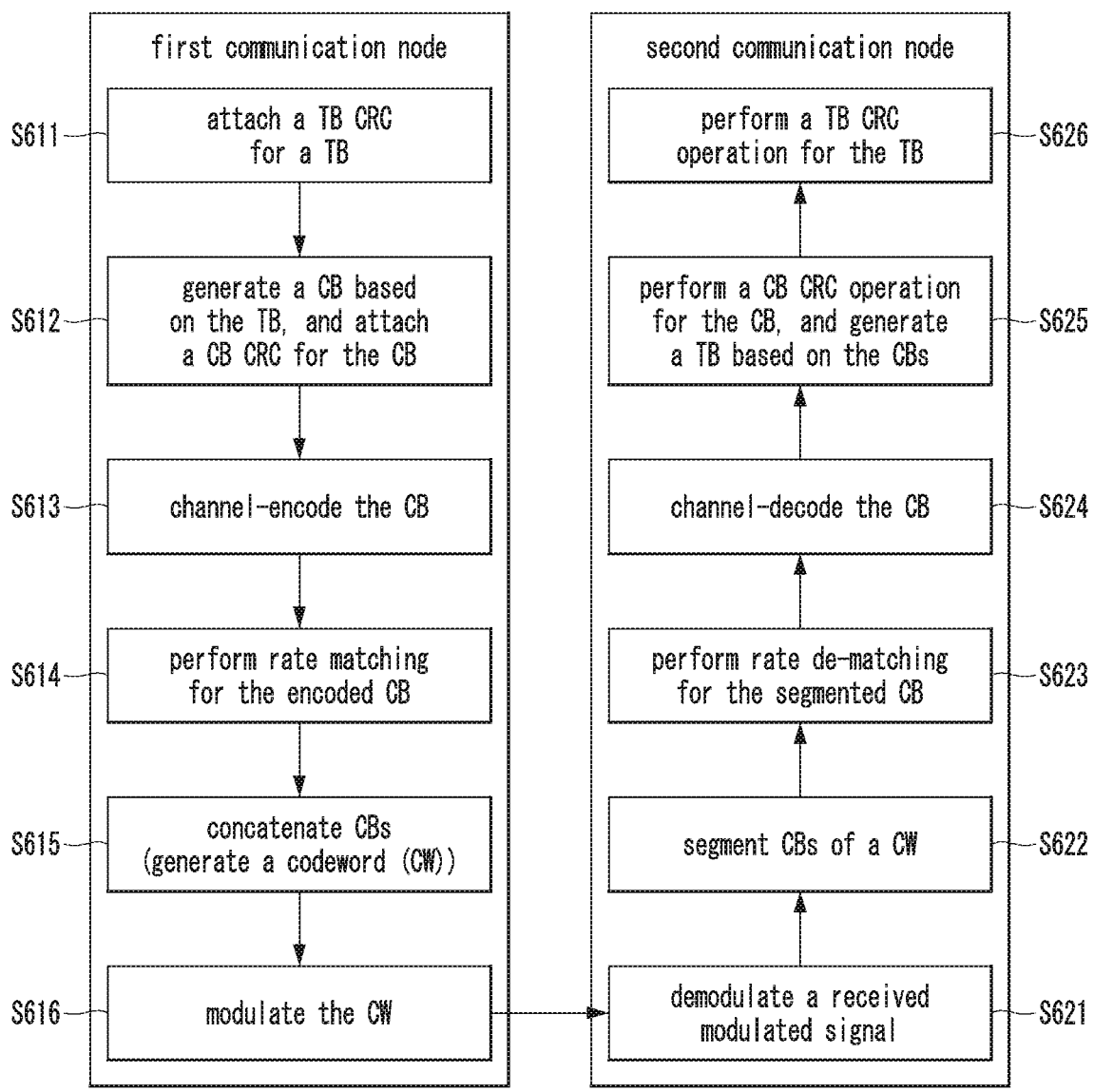
FIG. 6 is a conceptual diagram illustrating a first exemplary embodiment of a PHY layer.

FIG. 6 is a conceptual diagram illustrating a first exemplary embodiment of a PHY layer.

Referring to FIG. 6, a first communication node may be a transmitter for transmitting a signal, and a second communication node may be a receiver for receiving the signal. Each of the first and second communication nodes may be configured identically or similarly to the communication node 300 shown in FIG. 3. The first communication node may perform a TB cyclic redundancy check (CRC) attachment operation on a TB by attaching a TB CRC value to a data TB received from the MAC layer (S611). According to an exemplary embodiment, the TB CRC value may be appended to an end position of the TB. The first communication node may generate one or more code blocks (CBs) by performing a CB segmentation operation on a result of step S611, may attach the CRC value to each of the CBs if necessary, and may insert filler bit(s) if necessary (S612). As a result of step S612, C CBs may be generated, and according to an exemplary embodiment, the number of CB sizes (i.e., CBSs) may be one or more. Although a signal transmission operation will be described based on only the r-th CB, a channel encoding operation and a rate matching operation may be performed for all CBs.

The first communication node may perform a channel encoding operation for the r-th CB, and, if necessary, input bit(s) as many as the size of bypass bit(s) may be excluded (S613). The r-th CB channel-encoded by step S613 may include a subset of the input bits when a channel encoder is systematic, and may additionally include parity bit(s) generated in the channel encoding operation. When step S613 is completed, the first communication node may perform a rate matching operation on the encoded r-th CB (S614). Also, if necessary, dummy bit(s) may be added in step S614. Also, null value(s) among the values added in steps S611 to S614 may be removed from the r-th CB rate-matched in step S614.

When step S614 is completed, the first communication node may perform a concatenation operation on the rate-matched r-th CB (S615), and the first communication node may perform a modulation operation on concatenated CBs (e.g., codeword) (S616). The modulated signal may be transmitted from the first communication node to the second communication node through a channel.

On the other hand, the second communication node may receive the signal from the first communication node and may perform a demodulation operation on the received signal (S621), and the second communication node may perform a segmentation operation on the demodulated signal (e.g., codeword) (S622). C CBs segmented in step S622 may be generated. Like the signal transmission operation described above, a signal reception operation will be described based on only the r-th CB, but a rate de-matching operation and a channel decoding operation may be performed for all CBs. The second communication node may perform a rate de-matching operation on the r-th CB (S623). In addition, a combining operation may be performed in step S623.

When step S623 is completed, the second communication node may perform a channel decoding operation on the rate-de-matched r-th CB (S624). The second communication node may perform a CB CRC operation (e.g., CB CRC verification and CB CRC removal) on the decoded CB, and when the CB CRC operation is completed, the second communication node may generate a TB by performing a concatenation operation on the decoded r-th CB (S625). When step S625 is completed, the second communication node may perform a TB CRC operation (e.g., TB CRC verification and TB CRC removal) on the generated TB (S626). When the TB CRC verification and/or the CB CRC verification is successfully completed, the second communication node may obtain the transmitted data TB.

Meanwhile, both the HARQ retransmission operation and the ARQ retransmission operation may be performed in the communication network. Since the HARQ RTT is shorter than the ARQ RTT, the HARQ retransmission operation may be performed more frequently than the ARQ retransmission operation within the same time interval. When data transmission fails, the HARQ retransmission operation may be performed preferentially. When data transmission fails even by the HARQ retransmission operation, the ARQ retransmission operation may be performed. When the ARQ retransmission operation is performed, the transmitter may generate a new data unit by collecting data units that have failed to be transmitted. In this case, the size and/or position of the new data unit may be different from the size and/or position of the previous data unit. The MAC layer and/or PHY layer of the transmitter may determine that the ARQ retransmission data is not related to the previous transmission because the size and/or position of the new data unit may be different from those of the previous data unit, and may process the new data unit as PHY initiation transmission data. Here, the position may be a position within a TB, CBG, and/or physical resource.

The PHY layer of the receiver (e.g., terminal or base station) may determine that the ARQ retransmission data is not related to the previous transmission because the size and/or position of the ARQ retransmission data may be different from those of the previous transmission data. According to an exemplary embodiment, the determination of whether the ARQ retransmission data is related to the previous transmission may not be made in the receiver, but may be performed according to an indication from the transmitter. Accordingly, the PHY layer may process the ARQ retransmission data as PHY initial transmission data. In this case, although an intersection between the previous transmission data and the ARQ retransmission data exits, the receiver may not perform a combining operation, and thus the ARQ retransmission performance may not be improved. In order to obtain a gain of the retransmission performance by performing an FEC operation, the combining operation for the data may be required. In order to support this operation, in terms of rate matching/de-matching operation, a condition that the size and/or position of the ARQ retransmission data is the same as the size and/or position of the previous transmission data may be required. When a processing unit of data in the FEC operation is different from a processing unit of data in the ARQ retransmission operation, the condition that the size and/or position of the ARQ retransmission data is the same as the size and/or position of the previous transmission data may not be established. Therefore, the combining operation on the data may not be possible.

From the point of view of the PHY layer, the ARQ retransmission data may be regarded as initial transmission data rather than retransmission data, and the combining operation on the ARQ retransmission data may not be possible. Accordingly, the FEC operation may not be performed, and only the opportunistic ARQ retransmission performance according to a channel state may be expected. A coherent time may exist according to a channel state, but the coherent time may be valid for a short time (e.g., an interval between reference signals). The channel states at the (re)transmission times according to the ARQ retransmission operation may not have correlations with each other. Whether or not the ARQ retransmission is successful may vary depending on the channel state. If the channel state is good at the time of the ARQ retransmission, the corresponding ARQ retransmission may be successful. If the channel state is bad at the time of the ARQ retransmission, the corresponding ARQ retransmission may fail. In this case, it may be difficult to guarantee communication reliability.

In particular, in the NTN and/or NR communication network supporting sidelink communication, the HARQ retransmission operation may be disabled, and in this case, the communication reliability should be ensured only by the ARQ retransmission operation. Therefore, to ensure the communication reliability, an improved ARQ retransmission operation may be required.

Figure 7A:
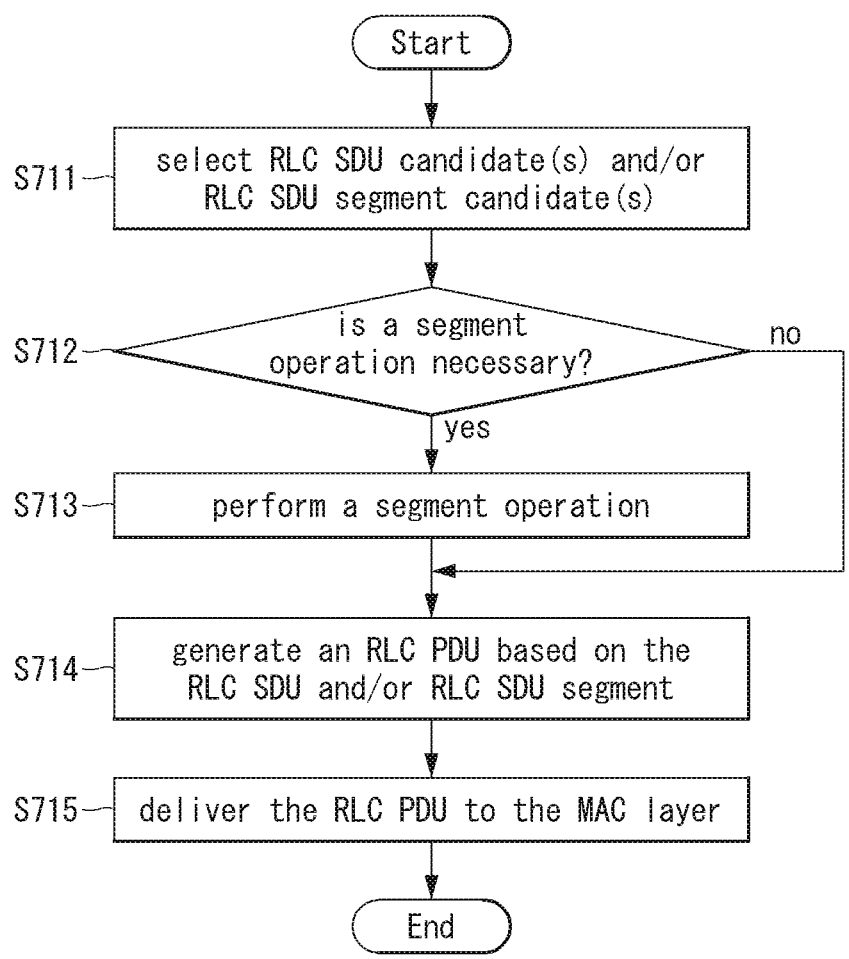
FIG. 7A is a flowchart illustrating a first exemplary embodiment of an ARQ retransmission operation performed in an RLC layer.
Figure 7B:
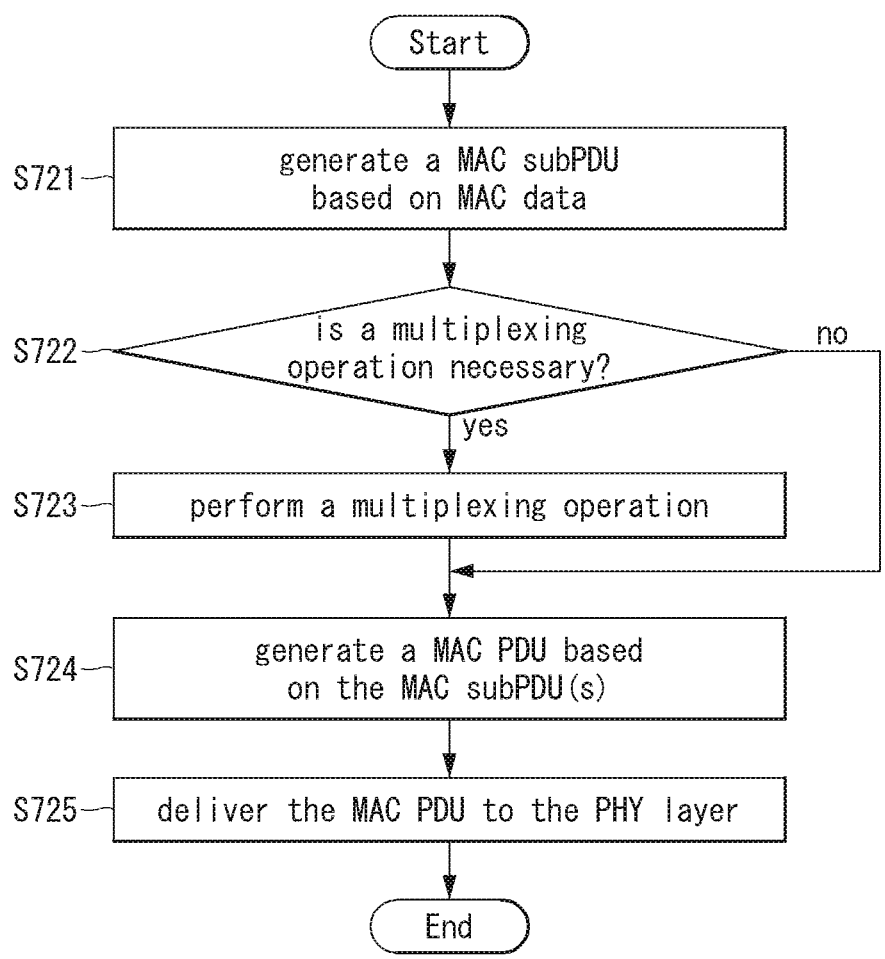
FIG. 7B is a flowchart illustrating a first exemplary embodiment of an ARQ retransmission operation performed in a MAC layer.

FIG. 7A is a flowchart illustrating a first exemplary embodiment of an ARQ retransmission operation performed in an RLC layer, and FIG. 7B is a flowchart illustrating a first exemplary embodiment of an ARQ retransmission operation performed in a MAC layer.

Referring to FIGS. 7A and 7B, a communication node (e.g., base station or terminal) may include a plurality of layers (e.g., RLC layer, MAC layer, and PHY layer). Operations performed in the plurality of layers may be operations performed by a processor included in the communication node. The ARQ retransmission operation shown in FIG. 7B may be performed after the ARQ retransmission operation shown in FIG. 7A. The operations shown in FIGS. 7A and 7B may be performed at a transmitter. The RLC layer may select RLC SDU(s) and/or RLC SDU segment(s) to be delivered to the MAC layer (S711). In step S711, RLC SDU candidate(s) and/or RLC SDU segment candidate(s) may be selected. The RLC layer may determine whether a segment operation is required for the RLC SDU(s) and/or the RLC SDU segment(s) (S712). When the segment operation is required, the RLC layer may perform a segment operation on the RLC SDU(s) and/or the RLC SDU segment(s) (S713). In step S713, an RLC SDU and/or RLC SDU segment on which the segment operation is to be performed may be selected, and the segment operation on the selected RLC SDU and/or RLC SDU segment may be performed. The RLC layer may generate an RLC PDU based on the RLC SDU(s) and/or the RLC SDU segment(s) (S714). The RLC layer may deliver the RLC PDU to the MAC layer (S715). The RLC PDU may include one or more RLC SDU(s) and/or one or more RLC SDU segment(s).

The MAC layer may receive the RLC PDU (e.g., MAC SDU) from the RLC layer. The MAC layer may generate MAC subPDU(s) based on MAC data (e.g., RLC PDU, MAC CE, padding) to be delivered to the PHY layer (S721). The MAC layer may determine whether a multiplexing operation for the MAC subPDU(s) is required (S722). When a multiplexing operation is required, the MAC layer may perform a multiplexing operation on the MAC subPDU(s) (S723). The MAC layer may generate a MAC PDU based on the MAC subPDU(s) (e.g., multiplexed MAC subPDU(s)) (S724). The MAC layer may deliver the MAC PDU to the PHY layer (S725). The PHY layer may receive the MAC PDU (e.g., physical SDU (PSDU) or TB) from the MAC layer, and may generate a physical PDU (PPDU) based on the PSDU, and transmit the PPDU to another communication node (e.g., a receiver).

Meanwhile, in order to improve the ARQ retransmission performance, the ARQ retransmission operation may be performed to enable a combining operation for the ARQ retransmission data. To support this operation, a segment operation in the RLC layer and/or a concatenation operation (e.g., multiplexing operation) in the MAC layer may be performed in consideration of a processing unit(s) of the rate matching/de-matching operation. In order to consider only a data region, the processing unit or reference size may be determined by further considering the effect of overhead. The overhead may be considered in all regions other than the data region. In terms of the combining operation of the PHY layer, the size and/or position of the ARQ retransmission data should be the same as the size and/or position of the previous data. In order to satisfy the above condition, the following operation(s) may be selectively performed. In an exemplary embodiment, the previous data may be data located before the ARQ transmission data in the time domain. For example, when the ARQ transmission data includes the 1st ARQ retransmission data, the previous data may be the 0-th ARQ retransmission data (i.e., ARQ initial transmission data). For another example, when the ARQ transmission data includes the (n+1)-th ARQ retransmission data, the previous data may be the n-th ARQ retransmission data. n may be a non-negative integer, and the 0-th ARQ retransmission data may refer to ARQ initial transmission data. As another example, when the n-th ARQ transmission data includes the k-th ARQ retransmission data, the previous data may be the entire data (or a subset of the entire data) corresponding to all m-th ARQ transmissions (m<n), and the k-th ARQ retransmission data may be an intersection (or a subset of the intersection) of the previous data and the n-th ARQ transmission data. Each of m, n, and k may be a non-negative integer, and the 0-th ARQ retransmission may refer to ARQ initial transmission data. That is, the ARQ retransmission data may be data whose intersection with the previous data is not empty among the ARQ transmission data, the ARQ initial transmission data may be data whose intersection with the previous data is empty, and the ARQ transmission data may be a combination of the ARQ initial transmission data and the ARQ retransmission data.

[Method for Ensuring Identity of Data Content Between ARQ Retransmission Data and Previous Data]

In order to perform the combining operation on the ARQ retransmission data in the receiver, it may be preferable to ensure the sameness between the contents of the ARQ retransmission data and the contents of the previous data. The MAC layer may request the RLC layer to transmit a specific data unit, and the RLC layer may deliver the data unit requested by the MAC layer to the MAC layer. The RLC layer may perform a segment operation or a re-segment operation on the data unit if necessary and may deliver a result of the segment operation or re-segment operation to the MAC layer. In order to support the above-described operation, an interface may be added between the MAC layer and the RLC layer, and the interface may be as follows.

The MAC layer may directly request transmission of RLC PDU(s) to the RLC layer. For example, the MAC layer may transmit an RLC header indicating the RLC PDU(s) for which (re)transmission is required to the RLC layer. The RLC header may include a sequence number (SN), a sequence offset (SO), etc., and the SN and/or SO may be used to indicate the RLC PDU(s). The RLC layer may identify the RLC PDU(s) requested by the MAC layer (e.g., RLC SDU(s) and/or RLC SDU segment(s) belonging to the RLC PDU(s)), and may deliver the RLC PDU(s) including the RLC SDU(s) and/or RLC SDU segment(s) to the MAC layer.

Alternatively, RLC PDU(s) for which (re)transmission is required may be indicated by a HARQ process number. The RLC layer may store information on RLC PDU(s) delivered to the MAC layer for each HARQ process number. The MAC layer may inform the RLC layer of a HARQ process number associated with the RLC PDU(s) for which (re)transmission is required. That is, the MAC layer may request the RLC layer to transmit the RLC PDU(s) associated with the HARQ process number. The RLC layer may identify the RLC PDU(s) associated with the HARQ process number received from the MAC layer (e.g., RLC SDU(s) and/or RLC SDU segment(s) belonging to the RLC PDU(s)), may deliver the RLC PDU(s) including the RLC SDU(s) and/or RLC SDU segment(s) to the MAC layer.

According to an exemplary embodiment, in order to support the above-described operation, time resource information (e.g., frame information, frame number, subframe number, slot number, mini-slot number, transmission time interval (TTI) number, symbol number, etc.) may be used instead of the HARQ process number. The time resource information may indicate time resource(s) in which the RLC PDU(s) requiring (re)transmission has been transmitted. In this case, the RLC layer may store the time resource information of the RLC PDU(s) delivered to the MAC layer. The MAC layer may deliver the time resource information of the RLC PDU(s) requiring (re)transmission to the RLC layer. The RLC layer may identify the RLC PDU(s) (e.g., RLC SDU(s) and/or RLC SDU segment(s) belonging to the RLC PDU(s)) associated with the time resource information received from the MAC layer, and may deliver the RLC PDU(s) including the RLC SDU(s) and/or RLC SDU segment(s) to the MAC layer.

According to an exemplary embodiment, additionally, the RLC layer may exclude, based on ARQ feedbacks, RLC SDU(s) and/or RLC SDU segment(s) that have already been successfully transmitted among the RLC PDU(s) requested by the MAC layer from the RLC PDU(s) to be delivered to the MAC layer, and the RLC layer may calculate a total size of RLC PDU(s) to be retransmitted among the request RLC PDU(s) by subtracting a total size of the RLC PDU(s) that have already been successfully transmitted from a total size of RLC PDU(s) requested by the MAC layer. According to an exemplary embodiment, when the RLC layer does not consider the ARQ feedbacks, the successfully-transmitted RLC PDU(s) may not be excluded. In this case, the total size of the RLC PDU(s) to be retransmitted among the requested PDU(s) may be equal to the total size of the RLC PDU(s) requested by the MAC layer. In addition, the RLC layer may indicate to the MAC layer information on the RLC PDU(s) that have been successfully transmitted.

When the size of data indicated by the MAC layer (hereinafter, 'indicated data size') is different from the total size of the RLC PDU(s) to be retransmitted (hereinafter, 'requested retransmission RLC PDU size') among the RLC PDU(s) requested by the MAC layer, the RLC layer may operate as follows.

1) The Size of Data Indicated by the MAC Layer (i.e., Indicated Data Size)>the Total Size of the RLC PDU(s) to be Retransmitted (i.e., Requested Retransmission RLC PDU Size) Among the RLC PDU(s) Requested by the MAC Layer In order to determine the RLC PDU(s) to be delivered to the MAC layer, the RLC layer may identify all RLC PDU(s) requested by the MAC layer. All identified RLC PDU(s) may belong to the RLC PDU(s) to be delivered to the MAC layer.

Thereafter, for 'indicated data size—requested retransmission RLC PDU size', the RLC layer may select one or more RLC SDU(s) and/or one or more RLC SDU segment(s), and may match the total of the RLC PDU(s) to be delivered to the MAC layer to the indicted data size by adding the selected RLC SDU(s) and/or the selected RLC SDU segment(s) to the RLC PDU(s) to be delivered the MAC layer.

The size of the selected RLC SDU(s) and/or the selected RLC SDU segment(s) may correspond to 'indicated data size—requested retransmission RLC PDU size'. The one or more RLC SDUs and/or one or more RLC SDU segments selected in the RLC layer may be indicated by the MAC layer. Alternatively, the RLC layer may autonomously select one or more RLC SDU(s) and/or one or more RLC SDU segment(s). If necessary, the RLC layer may perform a segment operation (or re-segment operation) on the one or more RLC SDU(s) and/or one or more RLC SDU segment(s).

1) The Size of Data Indicated by the MAC Layer (i.e., Indicated Data Size)<the Total Size of the RLC PDU(s) to be Retransmitted (i.e., Requested Retransmission RLC PDU Size) Among the RLC PDU(s) Requested by the MAC Layer The RLC layer may select one or more RLC PDU(s) among the RLC PDU(s) requested by the MAC layer. The one or more RLC PDU(s) selected in the RLC layer may be indicated by the MAC layer. Alternatively, the RLC layer may autonomously select one or more RLC PDUs. The RLC layer may match the total size of the RLC PDU(s) to be delivered to the MAC layer to the indicated data size by performing a segment operation (or re-segment operation) for RLC SDU(s) and/or RLC SDU segment(s) belonging to the one or more RLC PDU(s) selected in correspondence to 'requested retransmission RLC PDU size—indicated data size'. The size of the result of the segment operation (e.g., RLC SDU segment(s)) may correspond to 'requested retransmission RLC PDU size—indicated data size', and RLC SDU(s) and/or RLC SDU segment(s) excluding the result of the segment operation may be selected. That is, the result of the segment operation may be excluded from the RLC PDU(s) to be delivered to the MAC layer.

[Method for Ensuring Identity Between a Position of ARQ Retransmission Data and a Position of Previous Data]

In order to perform a combining operation for the ARQ retransmission data in the receiver, it may be preferable to ensure the sameness between the position of the ARQ retransmission data and the position of the previous data. Here, the position may be a position within a transmission unit (e.g., TB) of a data unit. In order to satisfy the above-mentioned condition, when a multiplexing operation for MAC subPDU(s) (e.g., MAC SDU, MAC CE, padding) is performed in the MAC layer, a position of a specific data unit may not be changed. In order to support this operation, the MAC layer may store information on position(s) at which the MAC subPDU(s) are multiplexed within a MAC PDU (e.g., TB). In addition, since an operation of accessing a soft buffer is performed based on a HARQ process number during the combining operation, information on a HARQ process number to which the data unit is mapped may also be required for the combining operation. Therefore, the MAC layer may generate multiplexing information including information on the positions where the MAC subPDU(s) are multiplexed within the TB and the HARQ process number to which the data unit (e.g., MAC subPDU(s), MAC PDU(s)) is mapped. The information on the positions at which the MAC subPDU(s) are multiplexed within the TB may be indicated by at least one of an offset, a length, a code block (CB) number, a CBG number, or a combination thereof. In addition, the multiplexing information may further include information (e.g., RLC SN, RLC SO) for identifying the RLC SDU and/or the RLC SDU segment.

In the initial transmission procedure, the MAC layer may generate the above-described multiplexing information and store the multiplexing information in a memory. In the ARQ retransmission procedure, the MAC layer may perform a multiplexing operation on the MAC subPDU(s) so that the position of the ARQ retransmission data is the same as the position of the previous data within the TB according to the same HARQ process number with reference to the multiplexing information. In addition, the MAC layer may update the multiplexing information according to the ARQ (re)transmission procedure and may use the updated multiplexing information in the next ARQ (re)transmission procedure. The multiplexing information may be updated to reflect the result of the multiplexing operation of the MAC layer in the ARQ (re)transmission procedure.

According to an exemplary embodiment, the MAC layer may additionally perform the following operations. The MAC layer may explicitly or implicitly receive, from the RLC layer, information on the RLC PDU(s) that have already been successfully transmitted among the requested RLC PDU(s). The MAC layer may use a method of explicitly receiving information (e.g., SN and/or SO in an RLC header) specifying the RLC PDU(s) that have already been successfully transmitted and/or the RLC PDU(s) to be retransmitted based on the ARQ feedbacks or information corresponding to the above-described information. Alternatively, the MAC layer may identify the requested RLC PDU(s) and RLC PDU(s) having been actually delivered from the RLC layer to the MAC layer, and may implicitly identify the RLC PDU(s) that have already been successfully transmitted among the requested RLC PDU(s) by using a method of regarding the RLC PDU(s) that have not been received among the requested RLC PDU(s) as the RLC PDU(s) that have already been successfully transmitted or a method corresponding to the above-described method.

Through the above-described method or a method corresponding to the above-described method, RLC PDU(s) and/or MAC subPDU(s) corresponding to retransmission may be determined, and an end point of the previous data to be retransmitted may be calculated based on the existing multiplexing information of the MAC subPDU(s) corresponding to retransmission. The MAC layer may delete multiplexing information related to the RLC PDU(s) that have already been successfully transmitted.

The MAC PDU size of the current ARQ transmission data may be the same as the MAC PDU size of the previous ARQ transmission data. Alternatively, the MAC PDU size of the current transmission data may be different from the size of the previous data. In the above-described cases, the multiplexing operation for MAC subPDUs may be performed as follows. When the content of the current transmission data is different from that of the previous transmission data, when the size of the current transmission data is different from the size of the previous transmission data, or when a TB CRC of the current transmission is different from a TB CRC of the previous data, a combining operation for a CB in which the TB CRC exists may be prohibited.

1) Size of Current Transmission Data=Size of Previous Transmission Data

When the size of the current transmission data is the same as the size of the previous transmission data in the ARQ retransmission procedure, the processing unit(s) of the rate matching/de-matching operation of the current transmission may be maintained to be the same as the processing unit(s) of the rate matching/de-matching operation of the previous transmission. Accordingly, a combining operation of the ARQ retransmission data among the current transmission data and the previous data may be possible. Accordingly, the MAC layer may perform a multiplexing operation for the ARQ retransmission data (e.g., MAC subPDU(s)) at the position of the previous data based on the previous multiplexing information. In addition, when ARQ initial transmission data is included in the current transmission data, the MAC layer may perform a multiplexing operation for the ARQ retransmission data and may perform a method of performing the multiplexing operation for the ARQ initial transmission data in the remaining positions or a method corresponding thereto, thereby maximizing the size of a portion of the current transmission data having the same position as the previous transmission.

2) Size of Current Transmission Data≠Size of Previous Transmission Data

When the size of the current transmission data is different from the size of the previous transmission data in the ARQ retransmission procedure, the combining operation may not be possible. In this case, if no additional operation is performed, the ARQ retransmission data may be regarded as initial transmission data from the perspective of the PHY layer. In order to prevent the above problem, the MAC layer may additionally perform the following operation. When the size of the current transmission data needs to be different from the size of the previous transmission data, the MAC layer may select the data size of the current transmission so that the processing unit(s) of the rate matching/de-matching operation of the previous transmission is maintained as much as possible. That is, the MAC layer may select the data size of the current transmission so that the processing unit(s) of the rate matching/de-matching operation determined by the size of the data of the current transmission can be expressed as a linear combination (e.g., a multiple) of the processing unit(s) of the rate matching/de-matching operation determined by the size of the data of the previous transmission. This may mean that the MAC layer can determine the data size of the current transmission based on a linear combination of the processing unit(s) of the rate matching/de-matching operation based on the size of the data of the previous transmission when the ARQ retransmission is included in the current transmission. Additionally, the processing unit(s) of the rate matching/de-matching operation may be determined in consideration of the influence of overhead. When the size of the current transmission data is different from the size of the previous transmission data, the multiplexing operation may be performed as follows. The exemplary embodiment below may be applied when the processing unit of data in the combining operation is the same as the processing unit(s) of the previous data and/or when the processing unit of data in the combining operation is a linear combination of the processing unit(s) of the previous data.

2-1) End Point of Current Transmission Data<End Point of Previous Transmission Data to be Retransmitted If the end point of the current transmission data (e.g., the size of the current transmission data −1) is earlier than the end point of the previous transmission data to be retransmitted, only a part of the previous transmission data to be retransmitted may be selected to be multiplexed at the same position as the previous transmission, and the receiver may perform a combining operation on the previous transmission data and the current transmission data for the selected part of the previous transmission data to be retransmitted. In this case, in the procedure of selecting the previous transmission data to be multiplexed at the same position as the previous transmission, the data size for which the combining operation is possible may be maximized by a method of selecting all previous transmissions to be retransmitted satisfying a condition that the end point of the previous transmission data to be retransmitted in the TB is before or the same as the end point of the current transmission data. For the selected part of the previous transmission data to be retransmitted, the MAC layer may multiplex the MAC subPDU(s) of the selected previous transmission data at the same position as the previous transmission data within the TB based on the multiplexing information, and may process the selected part so that the receiver can perform a combining operation for the selected part. On the other hand, the combining operation for the remaining part (e.g., the part not selected to be multiplexed in the same position as the previous transmission) among the previous transmission data to be retransmitted may be abandoned, and the corresponding part may be multiplexed at the different position from the previous transmission data within the TB, and may be processed as initial transmission data that cannot be combined. For the remaining part of the previous transmission data to be retransmitted, the MAC layer may multiplex the MAC subPDU(s) in a position different from the previous transmission data within the TB, the receiver may abandon the combining operation for the remaining part, and may process it as initial transmission data. On the other hand, for another exemplary embodiment, if a quality of service (QoS) requirement is sufficiently satisfied, the corresponding part may be transmitted in the next ARQ transmission procedure, and it may be determined again whether the corresponding part can be multiplexed in the same position as the previous transmission (e.g., whether combining is possible or not) in the next ARQ transmission procedure.

If the size of the current transmission data is greater than the total size of the previous transmission data to be retransmitted and initial transmission data is additionally present, the MAC layer may multiplex MAC subPDU(s) of the initial transmission data in the remaining position of the current transmission data (e.g., position where MAC subPDU(s) of the previous transmission data to be retransmitted are not multiplexed). The multiplexing operation of the initial transmission data may be performed after the multiplexing operation of the remaining part. Alternatively, the multiplexing operation of the initial transmission data may be performed together with the multiplexing operation of the remaining part.

When the end point of the current transmission data is after or the same as the end point of the previous transmission data to be retransmitted, and no other data is transmitted at the combining position between the transmission of the previous transmission data and the transmission of the current transmission data, the combining operation may be possible. On the other hand, when the end point of the current transmission data is after the end point of the previous transmission data to be retransmitted, and other data is transmitted at the combining position between the transmission of the previous transmission data and the transmission of the current transmission data, the previous transmission data may not be preserved, so the combining operation between the current transmission data and the previous transmission data may not be possible. In this case, the ARQ retransmission data among the current transmission data may be regarded as initial transmission data from the perspective of the PHY layer.

2-2) End Point of Current Transmission Data≥End Point of Previously Transmitted Data to be Retransmitted When the end point of the current transmission data is after or the same as the end point of the previous transmission data to be retransmitted, the current transmission data may include all previous transmission data to be retransmitted. When the end point of the current transmission data is after the end point of the previous transmission data to be retransmitted, the multiplexing operation for the MAC subPDU(s) may be performed identically to the multiplexing operation for the MAC subPDU(s) when the size of the current transmission data is the same as the size of the previous data. For 'size of current transmission data—size of previous transmission data to be retransmitted', selection and multiplexing operation of a new data unit may be required. The new data unit may be a data unit on which a segment operation or a re-segment operation has been performed in the RLC layer.

[Method of Mutually Aligning a Processing Boundary of a Data Unit in the RLC Layer with a Processing Boundary of a Data Unit in a Combining Operation]

The segment operation in the RLC layer may be performed according to the total size of the RLC PDU notified by the lower layer (e.g., MAC layer). When a sum of the size of RLC SDU(s) and the size of RLC header(s) is greater than the total size of the RLC PDU requested by the MAC layer, the RLC layer may match the size of the RLC PDU to be delivered to the MAC layer to the total size of the RLC PDU(s) informed by the MAC layer by performing a segment operation for specific RLC SDU(s) and/or a re-segment operation for specific RLC SDU segment(s). A reference of the segment operation in the RLC layer may be the sum of the total sizes of the RLC PDU(s). In order to match the size of the RLC PDU(s) to be delivered to the MAC layer to the total size of the RLC PDU(s) requested by the MAC layer, the RLC layer may perform a segment operation or a re-segment operation for each of the RLC SDU(s) and the RLC SDU segment(s).

Since there is no size limitation of RLC PDU, size limitation of RLC SDU, and/or size limitation of RLC SDU segment, when the ARQ retransmission operation is performed, a case where the RLC SDU and/or RLC SDU segment spans two or more CBs may occur. In this case, the combining operation for the corresponding CB(s) may not be possible, and thus the ARQ retransmission performance may deteriorate. The above-described problem may occur because the processing unit of data unit in the ARQ retransmission operation is different from the processing unit of the data unit in the combining operation. In the following, method(s) of aligning a processing boundary of the data unit in the ARQ retransmission operation with a processing boundary of the data unit in the combining operation will be described.

The combining operation may refer to a rate de-matching operation. For reference, the rate matching operation may be viewed as a reverse operation of the combining operation, and in the rate matching and/or rate de-matching (e.g., combining) operation, the data processing unit may be a CB (i.e., CB size (CBS). However, the HARQ retransmission operation may be performed in units of CBG or TB. Accordingly, the processing unit of data in the combining operation may be a CBG (i.e., CBG size (CBGS)) or a TB (i.e., TB size (TBS)). A relationship 'CBS≤CBGS≤TBS' may be established. A relationship 'RLC SDU segment≤RLC SDU≤RLC PDU≤MAC PDU' may be established. The processing unit of the RLC SDU and/or the RLC SDU segment may be assumed to be a CB or CBG. This may mean that the boundary of the RLC SDU(s) or RLC SDU segment(s) is aligned with the boundary of the CB(s) or the boundary of the CBG(s). The RLC SDU segment may not necessarily be configured in units of a CB or CBG. Alternatively, the processing unit of the RLC SDU segment may be assumed to be another unit instead of a CB and CBG.

In the combining operation, the processing unit of the data unit may be a CBS or CBGS. Even in the case of not performing the segment operation on the CB, the CBS may be mathematically derived based on the TBS. The CBGS may be mathematically derived based on the CBS, and the CBGS may be an example of a linear combination of CBS(s). That is, in the combining operation, the processing boundary of the data unit may be derived based on the TBS. As a first method for matching the processing unit of the data unit, the size of one RLC SDU or one RLC SDU segment belonging to the MAC PDU delivered to the PHY layer may be configured as a linear combination of the processing unit(s) of the data unit in the rate matching/de-matching (e.g., combining) operation. The RLC layer may perform the segment operation on the RLC SDU and/or the RLC SDU segment to satisfy the above-described condition. In this case, the boundary of the RLC SDU and/or the RLC SDU segment may be aligned with the boundary of the processing unit of the data unit in the rate matching/de-matching operation.

The reference size for the segment operation in the RLC layer may be determined in consideration of the processing unit(s) of the data unit in the rate matching or rate de-matching (e.g., combining) operation. To support this operation, an interface may be added between the MAC layer and the RLC layer. The MAC layer may calculate the reference size(s) for the segment operation in the RLC layer and may inform the RLC layer of information on the reference size. In this case, the RLC layer may identify the reference size for the segment operation (e.g., the processing unit of the data unit in the segment operation) based on the information received from the MAC layer. Alternatively, the MAC layer may inform the RLC layer of parameters (e.g., TBS, CBS, multiplexing information, overhead, etc.) necessary for calculating the reference size for the segment operation in the RLC layer. The RLC layer may determine the reference size for the segment operation (e.g., the processing unit of the data unit in the segment operation) based on the parameters received from the MAC layer.

As a second method for matching the processing unit of the data unit, the size of one MAC data unit (e.g., MAC PDU) delivered to the PHY layer may be configured as a linear combination of the processing unit(s) of the data unit in the combining operation. The MAC layer may perform a multiplexing operation on the MAC subPDU(s) to satisfy the above-described condition.

In addition, the processing boundary, processing unit, or reference size of the data unit may be determined in consideration of overhead in order to consider only the data region. To account for regions other than the data region, overhead may be considered. For example, an RLC header, MAC header, MAC CE, padding bits, TB CRC, CB CRC, filler bits, bypass bits, dummy bits, parity bits, control information (CI), or other multiplexed information corresponding thereto may be selectively considered according to a position of a step in which the calculation is performed. The overhead may be excluded from a final size when deriving the processing boundary of the data unit, so that the processing boundary of the data unit may include only a region occupied by pure data.

Referring to the description of FIG. 6, overhead may be added in each step of the PHY layer and referring to FIGS. 4, 5A, and 5B, overhead may be added in each step of the upper layers (e.g., RLC layer, MAC layer). The overhead may be considered as follows according to the step in each layer.

For example, in the case of the PHY layer, the overhead may be considered as follows according to the step.

In the TB CRC attachment step, a TB CRC may be attached to the TB data. Therefore, the overhead in the TB CRC attachment step may be the size of the TB CRC (i.e., $L_{TBCRC}$). Accordingly, the output size B of the TB CRC attachment step may be determined as a sum of a TBS A and the TB CRC size, and ($B=A+L_{TBCRC}$) may be established. In the CB segmentation step, when B is less than or equal to the maximum CBS $K_{cb}$, C may be 1, and in other cases, C may be greater than 1.

If the number C of CBs is determined to be 1 in the CB segmentation step, the CB may be determined as a TB and may not include a CB CRC. If necessary, filler bits may be included in the CB. Accordingly, a CBS K may be determined as a sum of the TBS A, TB CRC size, and size $F_r$ of filler bits of the r-th CB. In this case, C may be 1, the CB CRC size $L_{CBCRC}$ may be 0, and thus ($L_{CBCRC}=0$) may be established. Accordingly, ($B'=B+C*L_{CBCRC}=B$) may be established. In addition, the average bit size K' per each CB may be ($K'=B'/C=B'=B$), and the CBS K may be determined through a base size $K_b$ and K' determined by B. Therefore, ($K=K'+F_r=B+F_r=A+L_{TBCRC}+F_r$) may be established. Therefore, the overhead generated in the CB segment step may be the size of filler bits of the r-th CB, the total overhead $TO_{CBSEG}$ up to the CB segmentation step may be the sum of the TB CRC size and the size of filler bits, and ($TO_{CBSEG}=L_{TBCRC}+F_r$) may be established. Therefore, when determining the processing unit(s) based on the CBS, the size of data in the CBS may be the size of a portion of the CBS excluding the total overhead ($=K-TO_{CBSEG}$). When C=1, the size of data in the CBS may be the TBS ($=K-TO_{CBSEG}=A+L_{TBCRC}+F_r(L_{TBCRC}+F_r)=A$).

If the number C of CBs is determined to be greater than 1 in the CB segmentation step, the CB may include a part of the TB and the CB CRC, and filler bits may be included in the CB if necessary. Accordingly, the CBS may be determined by the TBS, TB CRC size, CB CRC size $L_{CBCRC}$, and the size of filler bits of the r-th CB. In this case, $C=\lceil B_{cb}-L_{CBCRC}\rceil$ may be established, and $L_{CBCRC}\neq 0$ may be established. Accordingly, $B'=B+C*L_{CBCRC}$ may be established. In addition, the average bit size K' for each CB may be (K'=B'/C), and the CBS K may be determined through the base size $K_b$ and K' determined by B. Also, the size of filler bits of the r-th CB may be ($F_r$=K−K). Therefore, (K=K'+$F_r$) may be established, and the CB CRC size may be included in K'. Therefore, (K=(K'−$L_{CBCRC}$)+$L_{CBCRC}$+$F_r$) may be established, and the overhead generated in the CB segmentation step may be the sum of the CB CRC size and the size of filler bits (i.e., $L_{CBCRC}$+$F_r$). The total overhead $TO_{CBSEG}$ up to the CB segmentation step may be calculated differently depending on whether or not there is a TB CRC in the CB. In case of a CB without a TB CRC, the total overhead may be defined as ($TO_{CBSEG}$=$L_{CBCRC}$+$F_r$), and in case of a CB with a TB CRC, the total overhead may be defined as ($TO_{CBSEG}$=$L_{TBCRC}$+$L_{CBCRC}$+$F_r$). Therefore, when determining the processing unit(s) based on the CBS, the size of data in the CBS may be the size of a portion of the CBS excluding the total overhead (i.e., K−$TO_{CBSEG}$). In case of a CB without a TB CRC, (A+$L_{TBCRC}$)/C(=K−$TO_{CBSEG}$=K'−$L_{CBCRC}$=B'/C−$L_{CBCRC}$) may be defined. In case of a CB with a TB CRC, (A−(C−1)$L_{TBCRC}$)/C(=K−$TO_{CBSEG}$=K'−$L_{CBCRC}$−$L_{TBCRC}$=B'/C−$L_{CBCRC}$−$L_{TBCRC}$) may be defined. Therefore, when considering the effect of overhead on the processing size, even when the number of CBSs is one, the number of processing units may be determined to be one or more. As another example, there may be one or more CBSs. For example, if there are two CBSs, ($K_+,K_-$) may be defined, and the number of CBs ($C_+,C_-$) having the corresponding sizes may be separately defined. If there are X CBSs (e.g., $K_1, \ldots, K_X$), the processing unit ($P_1, \ldots, P_X$) considering only the data region may be determined for each CBS by excluding the effect of overhead within the processing unit through the above-described method.

Since the channel encoding step and/or the rate matching step are performed for each CB as described above, the position and size of TB data belonging to the corresponding CB may not change. Accordingly, in terms of TB data, a processing boundary of the channel encoding step and the rate matching step may not change in the channel encoding step and/or the rate matching step, and may be considered to be determined based on the CBS. Accordingly, it may be considered that a processing boundary of the rate de-matching (e.g., combining) step, which is a reverse operation of the rate matching operation, is also determined based on the CBS. In addition, the size of the processing unit in the step after the CB segmentation may be calculated by the above-described method in consideration of the overhead.

In the case of the upper layer, the overhead may be considered as follows depending on the step.

In the process of including the RLC SDU and/or the RLC SDU segment in the TB, the RLC header may be included as needed in the RLC PDU generation step. Accordingly, the overhead generated in the RLC PDU generation step may be the RLC header size (i.e., $L_{RLC,H}$). A MAC subheader may be included as needed in the MAC subPDU generation step, and accordingly, the overhead generated in the MAC subPDU generation step may be the MAC subheader size (i.e., $L_{MAC,H}$). In the MAC PDU generation step, if necessary, MAC subPDU(s) including MAC CE(s), MAC subPDU(s) including padding bits, and/or MAC subPDU(s) including other multiplexed information may be optionally included. The total overhead generated in the MAC PDU generation step may be determined as the total size $L_{MI}$ of the MAC subPDU(s) including the other multiplexed information.

In addition, the overhead generated in the MAC PDU generation step may selectively affect only some MAC subPDU(s) and may not affect the remaining MAC subPDU(s) according to a multiplexing situation. For example, the overhead generated in the MAC PDU generation step (hereinafter referred to as 'MAC PDU overhead') may only affect MAC subPDU(s) multiplexed within a specific combining processing unit to which a MAC sub-PDU including the MAC PDU overhead belongs. The MAC PDU overhead may not affect MAC subPDU(s) multiplexed in a position other than the specific combining processing unit to which the corresponding MAC PDU overhead belongs. Accordingly, if all MAC subPDU(s) belonging to the specific combining processing unit do not correspond to the MAC PDU overhead, the MAC PDU overhead may not be considered for the MAC subPDU(s). Alternatively, the MAC PDU overhead may be determined to be 0. As another example, if there are MAC subPDU(s) corresponding to the MAC PDU overhead within the specific combining processing unit, the MAC PDU overhead may be determined based on the size of MAC subPDU(s) including the MAC PDU overhead.

Also, the type of the MAC PDU overhead may be selectively considered according to a multiplexing position. That is, a range of the consideration may be configured differently according to the type of the MAC PDU overhead multiplexed together in the specific combining processing unit. Referring to FIG. 5A, as an example, for MAC subPDU(s) multiplexed in a front part of the MAC PDU, the MAC PDU overhead may be determined by considering only the size of the MAC subPDU(s) including MAC CE(s). As another example, for MAC subPDU(s) multiplexed in a rear part of the MAC PDU, the MAC PDU overhead may be determined by considering only the size of the MAC sub-PDU(s) including padding bits. As another example, when a MAC CE is not transmitted and padding is not required, the MAC PDU overhead may be determined without considering both the size of the MAC subPDU(s) including the MAC CE and the size of the MAC subPDU(s) including padding bits. As another example, when the entire MAC PDU is included in one combining processing unit, the MAC PDU overhead may be determined by considering both of the size of the MAC subPDU(s) including the MAC CE and the size of the MAC subPDU(s) including padding bits.

From the perspective of the RLC SDU and/or RLC SDU segment, the total overhead (i.e., $TO_{MACPDU}$) generated until projected to the TB may be determined as a sum of the overheads generated in the RLC PDU generation step, the MAC subPDU generation step, and the MAC PDU generation step. According to an exemplary embodiment, the overhead included in each step may be selectively considered. Referring to this, the RLC SDU and/or the RLC SDU segment may be projected to the TB in a state of including the overhead $TO_{MACPDU}$ generated in the upper layer.

The reference size of the RLC segment operation may be determined by aligning the size of the RLC SDU and/or RLC SDU segment in a state in which the processing boundary of the data unit in the RLC layer is project to the TB to the processing boundary in the combining operation. The size of the RLC SDU and/or the RLC SDU segment in the state of being projected on the TB may be a linear combination of the size ($P_1, \ldots, P_X$) of the processing unit(s) considering only the data region determined by the PHY layer.

When generating Y RLC SDUs and/or RLC SDU segments in the RLC layer, reference sizes ($P'_1, \ldots, P'_Y$) for Y RLC SDUs or RLC SDU segments may exist. The sum of the reference size $P'_y$ of the y-th RLC SDU or RLC SDU segment and the total overhead $TO_{MACPDU,y}$ generated until the y-th RLC SDU or RLC SDU segment is multiplexed in a TB may be a linear combination of the sizes ($P_1, \ldots, P_X$) of the processing unit(s) considering only the data region determined by the PHY layer. In this case, ($P'_y + TO_{MACPDU,y} = \sum_{x=1}^{X} w_x P_x$, where $w_x$=constant) may be established. Therefore, the reference size $P'_y$ of the y-th RLC segment may be determined as a difference between a linear combination $\sum_{x=1}^{X} w_x P_x$ of the size of the processing unit(s) considering only the data region determined by the PHY layer and the total overhead $TO_{MACPDU,y}$ generated until the y-th RLC SDU or RLC SDU segment is multiplexed in the TB. In this case, ($P'_y = (\sum_{x=1}^{X} w_x P_x) - TO_{MACPDU,y}$) may be established.

In addition, the PHY layer Px(s) used in the process of determining the reference size $P'_y$ of the y-th RLC segment may be reused during the process of determining the reference size of the y' ($\neq$y) RLC segment. The PHY layer Px(s) used in the process of determining the reference size $P'_y$ of the y-th RLC segment may not be used during the process of determining the reference size of the y' ($\neq$y)-th RLC segment. That is, when the number of CB(s) belonging to the CBS(s) ($K_1, \ldots, K_X$) is ($C_1, \ldots, C_X$), an arbitrary Px of the processing unit(s) considering only the data region determined by the PHY layer may be used up to Cx times. In addition, the reference size of the RLC segment may be sequentially determined according to the arrangement position in the TB.

The processing boundary(ies) and/or processing unit size(s) may be mutually aligned when a specific processing unit size(s) is a linear combination of other processing unit size(s). As a first method, the size of the RLC layer processing unit(s) may be a linear combination of the size of the processing unit(s) for the rate matching and/or combining. In this case, the size of the RLC layer processing unit(s) and the size of processing units for the rate matching and/or combining may be mutually aligned. As a second method, the size of processing unit(s) for the rate matching and/or combining may be a linear combination of the size of the RLC layer processing unit(s), and the size of the processing unit(s) for the rate matching and/or combining and the size of the RLC layer processing unit(s) may be aligned with each other. The first method and the second method may be equivalent to each other. According to an exemplary embodiment, the processing boundary(ies) may be aligned by aligning the RLC layer processing unit(s) to the processing unit(s) for the rate matching and/or combining. Alternatively, a method in which the processing unit(s) for the rate matching and/or combining is aligned to the RLC layer processing unit(s) may be performed.

The TBS, CBGS, and/or information unit corresponding thereto may be applied instead of the CBS as a basic unit of the determination operation of the processing unit. That is, the operation of aligning the processing boundary of the data unit in the RLC layer and the processing boundary of the data unit in the combining operation of the PHY layer may be performed without restrictions on a unit used. Among the above-described units, the CBGS may be an example of a linear combination of the CBS. Among the above-described units, the TBS may be an example of a linear combination of the CBS and/or a linear combination of the CBGS.

According to an exemplary embodiment, how often combining is possible may be different according to a relationship between the processing unit size of each layer.

As an example, when the reference size of the RLC segment operation determined in a basic unit is smaller than the minimum size of the rate matching and/or combining processing unit, one combining processing unit may include one or more RLC PDU(s) (e.g., one or more RLC SDU(s) and/or one or more RLC SDU segment(s)). However, considering that ARQ retransmission is performed in units of RLC PDUs in the RLC layer, transmission of some RLC PDU(s) may be successful in one combining processing unit, and the RLC PDU(s) that have been successfully transmitted may be replaced with initial transmission data. Accordingly, the identity of the content may not be maintained for one combining processing unit, and a case where combining is impossible may occur.

As another example, when the reference size of the RLC segment operation is configured to be larger than the minimum size of the rate matching and/or combining processing unit, one RLC PDU may be included in one or more combining processing units. In this case, a case where combining becomes impossible due to a content change of only some RLC PDUs within one combining processing unit may be prevented. However, when the reference size of the RLC segment operation is larger than a processing unit size of an indicator (e.g., CBGTI) indicating whether combining for ARQ retransmission is possible, whether combining for ARQ retransmission for one RLC PDU is possible may be mapped to the processing unit of the indicator (e.g., CBGTI) indicating whether combining for ARQ retransmission is possible. Accordingly, the efficiency of the combinability indicator for ARQ retransmission may be reduced. In addition, if the reference size of the RLC segment operation becomes excessively large, the flexibility of the multiplexing operation in the MAC layer may be reduced. According to the above-described methods, when an RLC SDU larger than a processing unit (e.g., reference size) of a data unit exists, the RLC layer may perform a segment operation on the corresponding RLC SDU(s) based on the processing unit and/or a re-segmentation operation on the corresponding RLC SDU segment(s). The size of the RLC SDU segment resulting from the segmentation operation and/or the re-segmentation operation may be a linear combination of the processing unit(s). If there is a MAC SDU smaller than the processing unit (e.g., reference size) of the data unit, the MAC layer may perform a multiplexing operation on MAC subPDU(s) associated with the corresponding MAC SDU based on the processing unit. The size of the MAC PDU resulting from the multiplexing operation may be a linear combination of the processing unit(s).

As a method of preventing the possibility of performing the combining operation from being reduced, the re-segmentation operation may be prohibited in the RLC layer. That is, an operation of generating an unnecessarily small data unit may be prohibited, and the segment operation in the RLC layer may be performed to generate data units having a similar size. The processing unit of the data unit in the ARQ retransmission operation may be maintained similarly to the processing unit of the data unit in the initial transmission operation. In this case, a combining operation for the ARQ retransmission data and the initial transmission data may be possible.

Separately from performing the ARQ retransmission operation to enable a partial combining operation, the transmitter may indicate to the receiver whether to perform the partial combining operation at the time of transmission of the ARQ retransmission data. A CBGTI may be used to support the above-described operation. For example, DCI including scheduling information of the ARQ retransmission data may include a CBGTI indicating whether to perform a partial combining operation on the corresponding ARQ retransmission data.

When a CBG transmission operation is supported, a data type (e.g., PHY initial transmission data or PHY retransmission data) may be determined based on NDI, and from the perspective of the PHY layer, the ARQ retransmission data may be processed (e.g., indicated and/or interpreted) as PHY initial transmission data. When the data type is PHY initial transmission data, the CBGTI may be used to indicate a combining operation (e.g., partial combining operation) in the ARQ retransmission procedure. In the ARQ retransmission procedure, a communication node (e.g., base station or terminal) may interpret the CBGTI as indicating whether to perform a combining operation (e.g., partial combining operation). For example, the communication node may interpret that the execution of the partial combining operation for CBG(s) is indicated by the CBGTI. However, when the ARQ retransmission data is the same as previous data (i.e., when all data is not changed in the ARQ retransmission procedure), the transmitter may inform the receiver that the corresponding data type is retransmission data by using an NDI. In this case, the CBGTI may be interpreted as indicating whether to retransmit the CBG(s) when the corresponding data type is retransmission, and at the same time whether to perform the combining operation for the CBG(s) whose transmission is indicated by the CBGTI may be interpreted as being indicated together.

The ARQ retransmission operation may be configured to enable a partial combining operation. In order to enable a partial combining operation in the ARQ retransmission procedure, a combination of a portion whose transmission has failed (e.g., a portion for which decoding has failed) among previous data and new data may be transmitted. In this case, the transmitter may instruct the receiver to perform a combining operation on the portion whose transmission has failed. For the above-described operation, a CBGTI included in DCI may be used, and the CBGTI may indicate a portion whose transmission has failed. When an indication unit of the combining operation has a size other than the CBGS or TBS, use of a parameter (e.g., NDI, CBGTI, CBGFI, etc.) indicating whether the PHY retransmission is performed, which is defined in the NR specification, may be impossible. In this case, the combining operation may be indicated to be performed by using a separate method. For example, similarly to the CBGTI, a CBTI may be defined, and the CBTI may be used to indicate whether a CB-unit combining operation is performed. A transmission indicator of a unit smaller than a CB may be defined, and the corresponding transmission indicator may be used to indicate whether a combining operation is performed. Regardless of the unit of the transmission indicator, if only whether the combining operation is performed during ARQ retransmission can be indicated, a transmission/reception operation for a data unit including the retransmission data and new data (initial transmission data) may be performed from the point of view of the PHY layer. Additionally, it may be possible to perform a combining operation of the retransmission data and the previous transmission data.

FIG. 8A is a flowchart illustrating a second exemplary embodiment of an ARQ retransmission operation performed in an RLC layer.

Referring to FIG. 8A, a communication node (e.g., base station or terminal) may include a plurality of layers (e.g., RLC layer, MAC layer, PHY layer). Operations performed in the plurality of layers may be operations performed by a processor included in the communication node. The exemplary embodiment shown in FIG. 8A may further include a step S811 compared to the exemplary embodiment shown in FIG. 7A. Step S811 may be performed to ensure the identity of data content between ARQ retransmission data and previous data. A step S814 in FIG. 8A may be performed in the same manner as step S713 in FIG. 7A. Alternatively, step S814 in FIG. 8A may be performed by further considering a processing boundary of a combining operation compared to step S713 in FIG. 7A. Step S814 may be performed to align a processing boundary of a data unit in the RLC layer with a processing boundary of a data unit in the combining operation.

The MAC layer may request the RLC layer to transmit RLC PDU(s) (e.g., RLC SDU(s) and/or RLC SDU segment(s)) for which (re)transmission is required. In this case, the MAC layer may deliver to the RLC layer an RLC header including SN and/or SO indicating the RLC PDU(s) for which (re)transmission is required. Alternatively, the MAC layer may deliver to the RLC layer a HARQ process number related to the RLC PDU(s) for which (re)transmission is required. The RLC layer may identify the RLC PDU(s) requested by the MAC layer (e.g., RLC PDU(s) for which (re)transmission is required) based on the information received from the MAC layer (S811).

The RLC layer may select RLC SDU candidate(s) and/or RLC SDU segment candidate(s) to be delivered to the MAC layer (S812). In step S812, the RLC SDU candidate(s) and/or RLC SDU segment candidate(s) may be selected from among RLC SDU candidate(s) and/or RLC SDU segment candidate(s) requested by the MAC layer. Alternatively, in step S812, the RLC SDU candidate(s) and/or the RLC SDU segment candidate(s) may be selected regardless of the request of the MAC layer. When step S811 is performed, step S812 may be omitted. In this case, the RLC SDU(s) and/or RLC SDU segment(s) requested by the MAC layer may be regarded as RLC SDU(s) and/or RLC SDU segment(s) selected by the RLC layer.

The RLC layer may determine whether the segment operation is required for the RLC SDU and/or the RLC SDU segment (S813). When the segment operation is required, the RLC layer may perform the segment operation on the RLC SDU and/or the RLC SDU segment (S814). In step S814, the RLC SDU and/or RLC SDU segment on which the segmentation operation is to be performed may be selected, and the segment operation may be performed on the selected RLC SDU and/or RLC SDU segment. In step S814, the segment operation may be performed without considering a processing boundary of the combining operation (e.g., a processing unit of a data unit in the combining operation). Alternatively, the segment operation in step S814 may be performed in consideration of the processing boundary of the combining operation. In this case, step S814 may be performed based on the above-described [Method of mutually aligning a processing boundary of a data unit in the RLC layer with a processing boundary of a data unit in a combining operation].

In the combining operation, the processing boundary of the data unit may be derived based on a TBS, and the reference size of the segment operation in the RLC layer may be determined based on the processing boundary of the data unit in the combining operation. For example, the reference size of the segment operation in the RLC layer may be a linear combination of the processing unit of the data unit in the combining operation. The MAC layer may determine the reference size of the segment operation and may inform the RLC layer of information on the reference size. In this case, the RLC layer may identify the reference size of the segment operation based on the information received from the MAC layer. Alternatively, the MAC layer may inform the RLC layer of parameters (e.g., TBS, CBS, etc.) required for calculating the reference size of the segment operation. The RLC layer may determine the reference size for the segment operation based on the parameters received from the MAC layer. In step S814, the RLC layer may perform the segment operation on the RLC SDU and/or the RLC SDU segment based on the aforementioned reference size. The result of the segment operation in the RLC layer may be a linear combination of the reference size.

When step S814 is completed, the RLC layer may generate an RLC PDU based on the RLC SDU and/or the RLC SDU segment (S815). The RLC layer may deliver the RLC PDU to the MAC layer (S816).

Figure 8B:
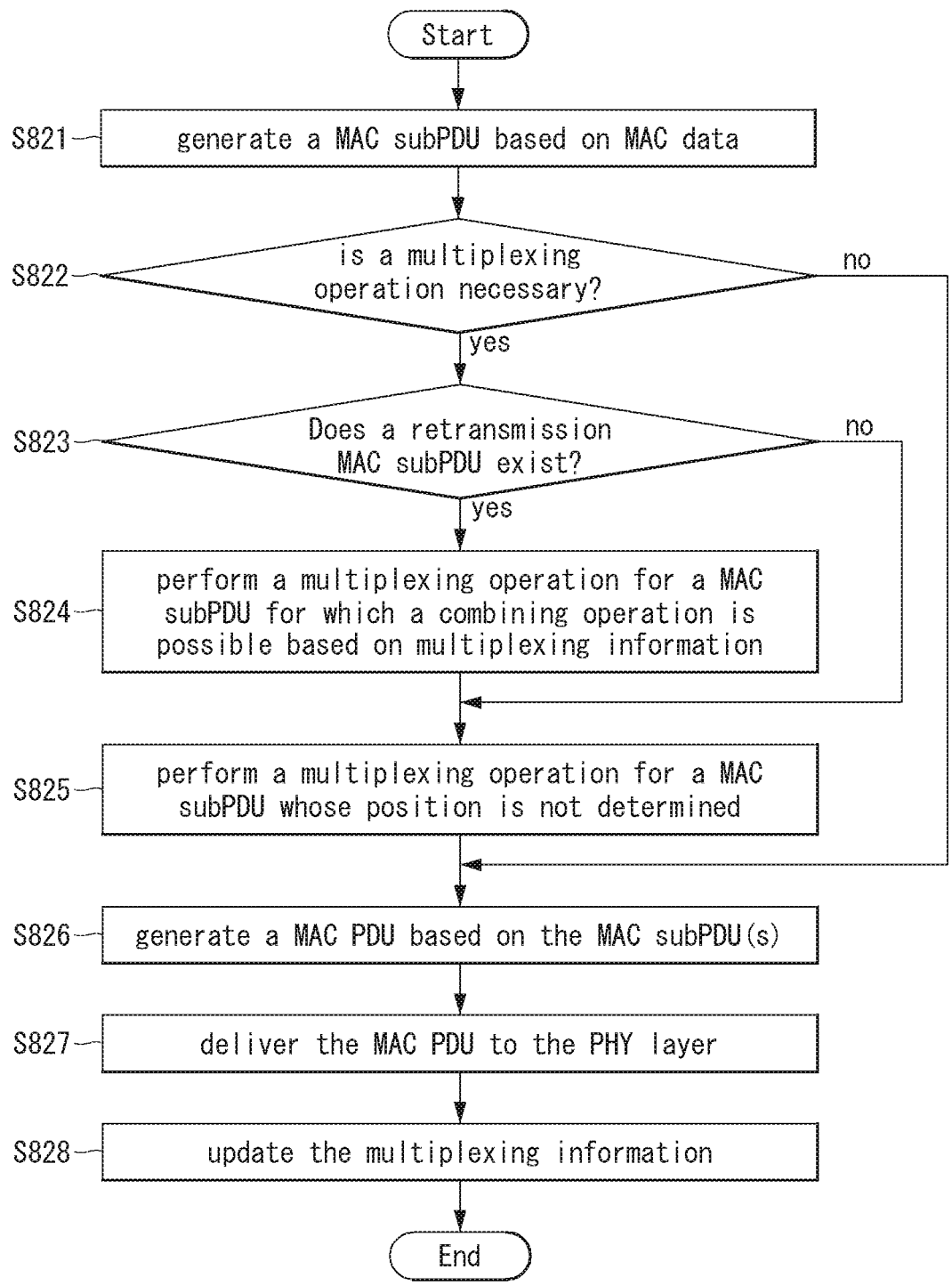
FIG. 8B is a flowchart illustrating a second exemplary embodiment of an ARQ retransmission operation performed in a MAC layer.

FIG. 8B is a flowchart illustrating a second exemplary embodiment of an ARQ retransmission operation performed in a MAC layer.

Referring to FIG. 8B, a communication node (e.g., base station or terminal) may include a plurality of layers (e.g., RLC layer, MAC layer, PHY layer). Operations performed in the plurality of layers may be operations performed by a processor included in the communication node. An ARQ retransmission operation shown in FIG. 8B may be performed after the ARQ retransmission operation shown in FIG. 7A or the ARQ retransmission operation shown in FIG. 8A.

The MAC layer may receive an RLC PDU (e.g., MAC SDU) resulting from the step S715 or step S816 from the RLC layer. The MAC layer may generate MAC subPDU(s) based on MAC data (e.g., RLC PDU, MAC CE, padding) to be delivered to the PHY layer (S821). The MAC layer may determine whether a multiplexing operation for the MAC subPDU(s) is required (S822). When the multiplexing operation is not required, the MAC layer may perform steps S826 to S828. When the multiplexing operation is required, the MAC layer may determine whether there is a retransmission MAC subPDU(s) (S823). The retransmission subPDU(s) may be MAC subPDU(s) to be retransmitted according to the ARQ retransmission operation. When the retransmission MAC subPDU(s) do not exist, the MAC layer may perform steps S825 to S828.

When the retransmission MAC subPDU(s) exist, the MAC layer may perform the step S824. In the step S824, the MAC layer may perform a multiplexing operation on the MAC subPDU(s) (e.g., retransmission MAC subPDU(s)) based on multiplexing information. The multiplexing information may include at least one of information on positions where the MAC subPDUs are multiplexed in a TB, information on HARQ process number(s) to which data units (e.g., MAC subPDUs, MAC PDU) are mapped, information for identifying an RLC SDU and/or RLC SDU segment (e.g., RLC SN, RLC SO), or a combination thereof. The MAC subPDU(s) may be MAC subPDU(s) on which a combining operation can be performed, and the positions of the MAC subPDU(s) in the TB may be indicated by the multiplexing information. The step S824 may be performed based on the above-described [Method for ensuring identity between a position of ARQ retransmission data and a position of previous data].

When the step S824 is completed, the MAC layer may perform a multiplexing operation on MAC subPDU(s) whose positions are not determined (S825). Here, the positions of the MAC subPDU(s) may not be indicated by the multiplexing information. The MAC subPDU(s) multiplexed in the step S825 may be initial transmission MAC subPDU(s) (e.g., new data unit). If there is no new data unit, the step S825 may be omitted. The MAC layer may generate a MAC PDU based on the MAC subPDU(s) (e.g., multiplexed MAC subPDU(s)) (S826). The MAC PDU may include a new data unit and/or a retransmission data unit. The MAC layer may deliver the MAC PDU to the PHY layer (S827). The MAC layer may update the multiplexing information by reflecting a result of the ARQ retransmission operation (e.g., the result of step S825) (S828). The step S828 may be performed before or after the step S827. The PHY layer may receive the MAC PDU (e.g., PSDU) from the MAC layer, generate a PPDU based on the PSDU, and transmit the PPDU to another communication node (e.g., receiver).

Each of the above-described exemplary embodiments may be configured differently according to information on whether a HARQ feedback is enabled or disabled, which is provided by a radio resource control (RRC) layer. For example, if the HARQ feedback is enabled, the above-described exemplary embodiments may not be performed. When the HARQ feedback is disabled, the above-described exemplary embodiments may be performed.

The exemplary embodiments of the present disclosure may be implemented as program instructions executable by a variety of computers and recorded on a computer-readable medium. The computer-readable medium may include a program instruction, a data file, a data structure, or a combination thereof. The program instructions recorded on the computer-readable medium may be designed and configured specifically for the present disclosure or can be publicly known and available to those who are skilled in the field of computer software.

Examples of the computer-readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first communication node including a physical (PHY) layer, a medium access control (MAC) layer, and a radio link control (RLC) layer, the operation method comprising:
   delivering, by the MAC layer, first information requesting transmission of one or more specific RLC service data units (SDUs) indicated by the MAC layer, to the RLC layer;
   identifying, by the RLC layer, an RLC protocol data unit (PDU) indicated by the first information;
   selecting, by the RLC layer, at least one RLC SDU belonging to the RLC PDU;

performing, by the RLC layer, a segment operation on the at least one RLC SDU when a total size of the RLC PDU does not fit within a total size indicated by the MAC layer;
delivering, by the RLC layer, the RLC PDU generated based on a result of the segment operation to the MAC layer;
delivering, by the MAC layer, a MAC PDU generated based on the RLC PDU to the PHY layer; and
transmitting, by the PHY layer, a physical PDU (PPDU) generated based on the MAC PDU to a second communication node.

2. The operation method according to claim 1, wherein the first information includes at least one of a sequence number (SN), segment offset (SO), hybrid automatic repeat request (HARQ) process number, or time resource information of each of the one or more RLC SDUs or RLC SDU segments, and the at least one of the SN, the SO, the HARQ process number, or the time resource information is used for indicating the RLC PDU to be transmitted.

3. The operation method according to claim 1, further comprising delivering, by the MAC layer, second information indicating a second size of transmission data to the RLC layer, wherein when the second size is larger than a first size of the one or more RLC SDUs indicated by the first information, one RLC SDU or one RLC SDU segment having a size corresponding to (second size-first size) is additionally selected.

4. The operation method according to claim 1, further comprising delivering, by the MAC layer, second information indicating a second size of transmission data to the RLC layer, wherein when the second size is less than a first size of the one or more RLC SDUs indicated by the first information, an RLC SDU segment having a size corresponding to (first size-second size) is generated by performing a segment operation for one RLC SDU among the one or more RLC SDUs, and the RLC SDU segment is not included in the RLC PDU generated by the RLC layer.

5. The operation method according to claim 1, wherein the segment operation is performed in consideration of a processing unit of a data unit in a rate matching operation or a combining operation of the second communication node, and the processing unit is determined based on at least one of a transport block size (TBS), code block group size (CBGS), code block size (CBS), overhead, or a combination thereof.

6. The operation method according to claim 5, wherein a reference size of the segment operation is determined based on the processing unit of the rate matching operation or the combining operation, and the reference size is determined based on a linear combination of the processing unit.

7. The operation method according to claim 6, wherein the reference size of the segment operation is determined in the MAC layer or determined in the RLC layer based on parameter(s) provided by the MAC layer.

8. The operation method according to claim 1, wherein the delivering of the MAC PDU to the PHY layer comprises:
generating, by the MAC layer, a plurality of MAC subPDUs based on the RLC PDU;
generating, by the MAC layer, the MAC PDU by performing a multiplexing operation for the plurality of MAC subPDUs so that positions of previous data units within a transport block (TB) and positions of the plurality of MAC subPDUs within a TB are same; and
delivering, by the MAC layer, the MAC PDU to the PHY layer.

9. The operation method according to claim 8, wherein the RLC PDU or the plurality of MAC subPDUs include at least one of the previous data units, a subset of the previous data units, initial transmission data, automatic repeat request (ARQ) retransmission data, or a combination thereof.

10. The operation method according to claim 8, wherein the multiplexing operation is performed based on preconfigured multiplexing information, and the preconfigured multiplexing information includes information indicating the positions in which the plurality of MAC subPDUs are multiplexed within the TB, information on a HARQ process number to which the plurality of MAC subPDUs are mapped, time resource information, information for identifying the at least one RLC SDU, information for identifying an RLC SDU segment, or a combination thereof.

11. The operation method according to claim 8, wherein the multiplexing operation is performed so that a size of the MAC PDU delivered to the PHY layer is determined based on a linear combination of a processing unit of a data unit in a rate matching operation of the first communication node or a combining operation of the second communication node.

12. The operation method according to claim 10, wherein the preconfigured multiplexing information is updated based on a result of the multiplexing operation for the plurality of MAC subPDUs.

13. The operation method according to claim 1, further comprising: transmitting, to the second communication node, scheduling information of the PPDU and third information indicating whether to perform a partial combining operation for the PPDU, wherein the PPDU includes at least one of a subset of previous data units or ARQ retransmission data, and the third information is determined based on at least of a new data indicator (NDI), code block group transmission information (CBGTI), code block transmission information (CBTI), or a combination thereof.

14. An operation method of a first communication node including a physical (PHY) layer, a medium access control (MAC) layer, and a radio link control (RLC) layer, the operation method comprising:
delivering, by the RLC layer, an RLC protocol data unit (PDU) to the MAC layer;
generating, by the MAC layer, a plurality of MAC subPDUs including retransmission data units based on the RLC PDU;
generating, by the MAC layer, a MAC PDU by performing a multiplexing operation for the plurality of MAC subPDUs so that positions of previous data units in a transport block (TB) and positions of the plurality of MAC subPDUs including the retransmission data units in a TB are same;
delivering, by the MAC layer, the MAC PDU to the PHY layer; and
transmitting, by the PHY layer, a physical PDU (PPDU) generated based on the MAC PDU to a second communication node.

15. The operation method according to claim 14, wherein the retransmission data units include at least one of the previous data units, a subset of the previous data units, automatic repeat request (ARQ) retransmission data, or a combination thereof.

16. The operation method according to claim 14, wherein the multiplexing operation is performed based on preconfigured multiplexing information, and the preconfigured multiplexing information includes at least one of information indicating the positions in which the plurality of MAC subPDUs are multiplexed within the TB, information on a HARQ process number to which the plurality of MAC subPDUs are mapped, time resource information, information for identifying the at least one RLC SDU, information for identifying an RLC SDU segment, or a combination thereof.

17. The operation method according to claim 16, wherein the preconfigured multiplexing information is updated based on a result of the multiplexing operation for the plurality of MAC subPDUs.

18. The operation method according to claim 14, wherein the multiplexing operation is performed so that a size of the MAC PDU delivered to the PHY layer is determined based on a linear combination of a processing unit of a data unit in a rate matching operation of the first communication node or a combining operation of the second communication node.

19. The operation method according to claim 14, wherein the delivering of the RLC PDU to the MAC layer comprises:
    delivering, by the MAC layer, first information requesting transmission of one or more RLC SDUs to the RLC layer;
    selecting, by the RLC layer, at least one RLC SDU based on the first information;
    performing, by the RLC layer, a segment operation on the at least one RLC SDU; and
    delivering, by the RLC layer, the RLC PDU generated based on a result of the segment operation to the MAC layer.

20. The operation method according to claim 19, wherein the segment operation is performed in consideration of a processing unit of a data unit in a rate matching operation of the first communication node or a combining operation of the second communication node, the processing unit is determined based on at least one of a transport block size (TBS), code block group size (CBGS), code block size (CBS), overhead, or a combination thereof, a reference size of the segment operation is determined based on the processing unit, and the reference size is determined based on a linear combination of the processing unit.

* * * * *